United States Patent
Smith et al.

(10) Patent No.: US 12,514,181 B2
(45) Date of Patent: Jan. 6, 2026

(54) APPARATUS AND METHODS FOR PLANT POLLINATION

(71) Applicant: MJNN LLC, South San Francisco, CA (US)

(72) Inventors: Damon Smith, Laramie, WY (US); Kevin Grauberger, Laramie, WY (US); Aunders Hallsten, Cheyenne, WY (US); Michael Baldwin, Laramie, WY (US); Lucas Woodbury, Laramie, WY (US)

(73) Assignee: MJNN LLC, South San Francisco, CA (US)

( * ) Notice: Subject to any disclaimer, the term of this patent is extended or adjusted under 35 U.S.C. 154(b) by 0 days.

(21) Appl. No.: 18/027,539

(22) PCT Filed: Sep. 22, 2021

(86) PCT No.: PCT/US2021/051427
§ 371 (c)(1),
(2) Date: Mar. 21, 2023

(87) PCT Pub. No.: WO2022/066690
PCT Pub. Date: Mar. 31, 2022

(65) Prior Publication Data
US 2023/0371450 A1 Nov. 23, 2023

Related U.S. Application Data

(60) Provisional application No. 63/082,984, filed on Sep. 24, 2020.

(51) Int. Cl.
*A01H 1/02* (2006.01)
(52) U.S. Cl.
CPC .................................. *A01H 1/027* (2021.01)

(58) Field of Classification Search
CPC ............. A01H 1/027; A01G 7/06; A01G 7/00
See application file for complete search history.

(56) References Cited

U.S. PATENT DOCUMENTS

| 5,956,897 A * | 9/1999 | Takashima ............. A01G 31/00 47/60 |
| 8,234,812 B1 * | 8/2012 | Colless .................. A01G 31/06 47/61 |

(Continued)

FOREIGN PATENT DOCUMENTS

CA 3115140 A1 5/2020

OTHER PUBLICATIONS

International Search Report and Written Opinion, PCT/US2021/051427, Feb. 25, 2022.

(Continued)

*Primary Examiner* — Magdalena Topolski
*Assistant Examiner* — Katherine Anne Kloecker
(74) *Attorney, Agent, or Firm* — Patterson + Sheridan, LLP

(57) ABSTRACT

Embodiments of the present disclosure relate to apparatus and methods for mechanized pollination. Grow towers vertically disposed on a grow line are moved into a pollination chamber and mechanized pollination is performed utilizing pneumatic, acoustic, or mechanical methods to pollinate plants growing in the grow towers. In one embodiment, a plurality of rotatable brush towers are disposed on opposite sides of the grow line and bristles from the brush towers are rotated over the plants to facilitate pollination as the grow towers traverse along the grow line. In another embodiment, a plurality of conduits internal to the grow towers are coupled to one or more nozzles on a face of the grow towers. Pollen is delivered through the nozzles toward the plants utilizing pressurized gas.

6 Claims, 11 Drawing Sheets

(56) References Cited

U.S. PATENT DOCUMENTS

| | | | |
|---|---|---|---|
| 10,314,251 B2* | 6/2019 | Gagne | A01G 9/247 |
| 11,240,968 B2* | 2/2022 | Hunter | A01H 1/027 |
| 11,304,384 B2* | 4/2022 | Voelz | A01G 9/249 |
| 11,930,751 B2* | 3/2024 | Hu | A01H 1/027 |
| 2003/0159348 A1* | 8/2003 | Clark | A01H 1/027 |
| | | | 47/58.1 FV |
| 2018/0042186 A1 | 2/2018 | Kop | |

OTHER PUBLICATIONS

Montel Inc. Grow More et al: Give your vertical farm a breath of fresh air with Montel's Loopair(TM) dual circulation system, Aug. 25, 2022 (Aug. 25, 2020), XP055871267, Retrieved from the Internet: URL: https://www.youtube.com/watch?v=eViPqUvHAwl the whole document.

* cited by examiner

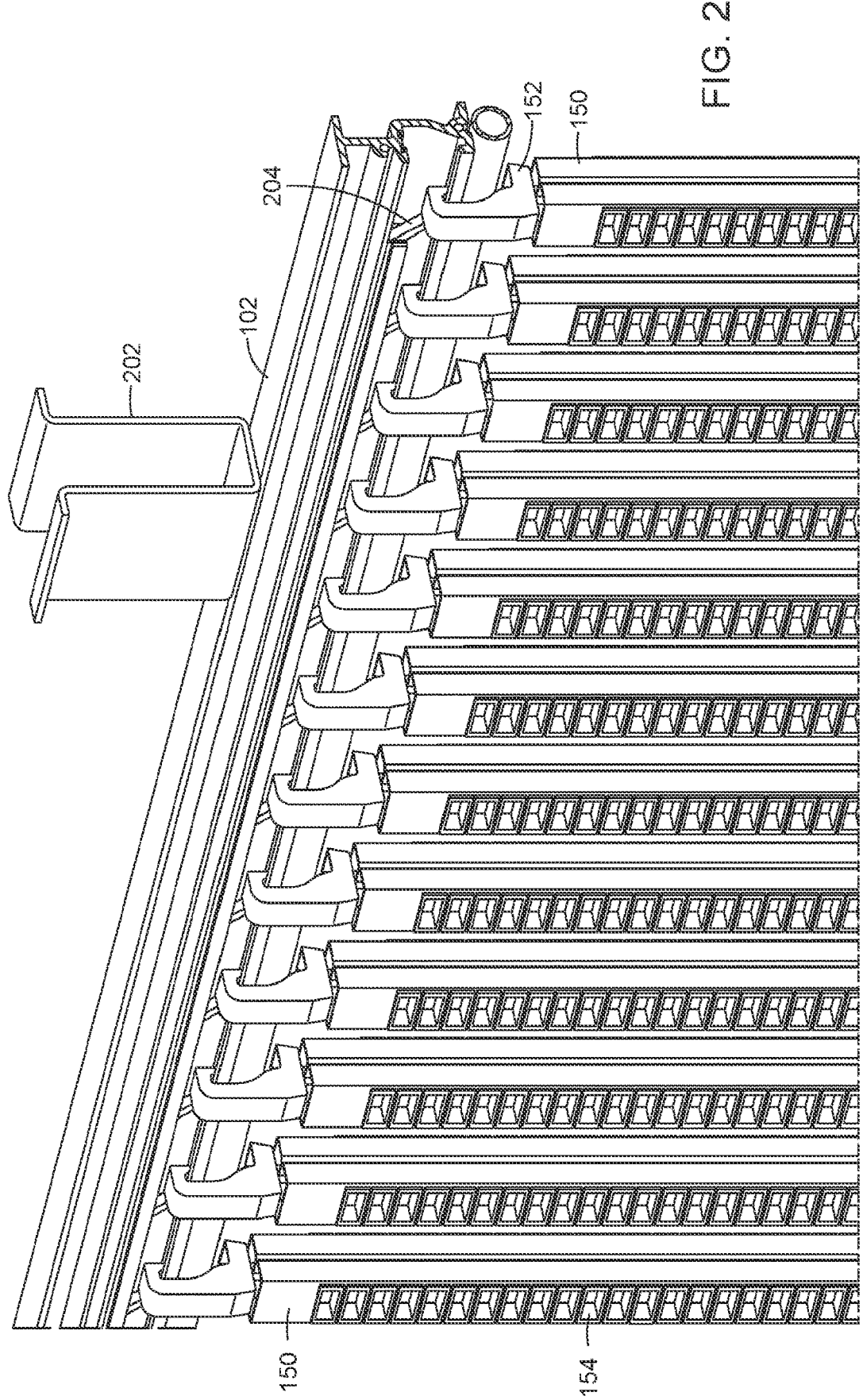

APPARATUS AND METHODS FOR PLANT POLLINATION

BACKGROUND

Field

Embodiments of the present disclosure generally relate to environmentally controlled indoor agricultural systems. More specifically, embodiments of the present disclosure relate to apparatus and methods for plant pollination.

Description of the Related Art

Conventional agricultural practices have evolved rapidly over the twentieth century to what can now be considered a fast-moving high-tech industry. Global food shortages, climate change, a societal changes instigated a transition from manually implemented agriculture techniques toward advanced farming methods, such as mechanized and automated farming. While conventional agricultural practices often limit a farmer to one growing season, indoor farming can eliminate environmental constraints and increase crop production.

However, commercial scale controlled environment agriculture is still in its relative infancy when compared to conventional agricultural practices. Although there exists great potential for production of many different types of plants in controlled environment agriculture, plants requiring pollination for produce production present additional challenges to successful implementation. For example, conventional agricultural practices utilize naturally occurring pollination vectors, such as bees or the like, to facilitate pollination. Effective implementation of live pollination vectors in controlled environment agricultural systems is an additional challenge and is not well developed.

Thus, what is needed in the art are improved apparatus and methods for plant pollination. More specifically, what is needed are improved mechanized pollination apparatus and methods for controlled environment agriculture systems.

SUMMARY

In one embodiment, a pollination system is provided. The system includes a grow line having a plurality of grow towers disposed thereon and a pollination chamber defining a volume. The pollination chamber is coupled to the grow line and is operable to isolate one or more grow towers within the volume from a surrounding environment. A pollen source is in fluid communication with the volume and a blower is in fluid communication with the volume. The blower is adapted to circulate pollen within the volume.

In another embodiment, a pollination apparatus is provided. The apparatus includes a plurality of walls at least partially defining a volume therein, a ceiling coupled to the plurality of walls, a base coupled to the plurality of walls opposite the ceiling, a screen coupled to the each wall of the plurality of walls and extending across the volume, a blower in fluid communication with the volume via an outlet formed in the base, and a pollen source in fluid communication with the volume.

In another embodiment, a pollination system is provided. The system includes a grow line having a plurality of grow towers disposed thereon and a gutter disposed opposite the grow line. The gutter includes a channel sized to accommodate a width of the grow towers. One or more vibration generators are coupled to the gutter or the grow line.

In another embodiment, a pollination system is provided. The system includes a grow line and a grow tower coupled to the grow line by a hook at a first end of the grow tower. The hook includes a spring. A peg is coupled to and extends from a second end of the grow tower opposite the first end and a wedge is disposed adjacent to the second end of the grow tower.

In another embodiment, a pollination method is provided. The method includes moving a grow tower including a peg, coupled to a grow line by a hook including a spring, along a travel path. The peg is engaged with a surface of the wedge, the grow tower is moved further along the travel path which causes the spring to elongate, and the grow tower is further moved along the travel path so that the peg disengages from the surface of the wedge.

In another embodiment, a pollination system is provided. The system includes a grow line having one or more grow towers disposed thereon, a first emitter disposed adjacent to a first side of the grow towers, a second emitter disposed adjacent to a second side of the grow tower opposite the first side, a plurality of nozzles couple to each of the first and second emitters, and a pollen source in fluid communication with the nozzles via the first and second emitters.

In another embodiment, a pollination system is provided. The system includes a grow line having one or more grow towers disposed thereon, a first emitter disposed adjacent to a first side of the grow towers, a second emitter disposed adjacent to a second side of the grow towers opposite the first side; distributors including one or more nozzles coupled to each of the first and second emitters, and a camera coupled to each of the distributors.

In another embodiment, a pollination method is provided. The method includes identifying, via visualization by a camera, a plant disposed in a grow tower to be pollinated, moving a pollen distributor having a nozzle in a vertical plane to a position adjacent to the plant to be pollinated, and delivering pollen to the plant via the nozzle and the distributor.

In another embodiment, a pollination apparatus is provided. The apparatus includes a grow tower having a face with a plurality of plug holders disposed therein, a first conduit extending through an internal volume of the grow tower, a plurality of second conduits extending from the first conduit to the face adjacent to each of the plurality of plug holders, and a nozzle coupled to each of the plurality of second conduits. The nozzles are disposed on the face of the grow tower.

In another embodiment, a pollination system is provided. The system includes a grow line having one or more grow towers disposed thereon, a first column disposed adjacent to a first side of the grow towers, a second column disposed adjacent to a second side of the grow towers opposite the first side, and a plurality of brushes coupled to and extending from each of the first and second columns.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 2 illustrates a perspective view of a portion of a grow line with the grow towers according to an embodiment of the disclosure

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to apparatus and methods for mechanized pollination. Grow towers vertically disposed on a grow line are moved into a pollination chamber and mechanized pollination is performed utilizing pneumatic, acoustic, or mechanical methods to pollinate plants growing in the grow towers. In one embodiment, a plurality of rotatable brush towers are disposed on opposite sides of the grow line and bristles from the brush towers are rotated over the plants to facilitate pollination as the grow towers traverse along the grow line. In another embodiment, a plurality of conduits internal to the grow towers are coupled to one or more nozzles on a face of the grow towers. Pollen is delivered through the nozzles toward the plants utilizing pressurized gas.

Figure 1:
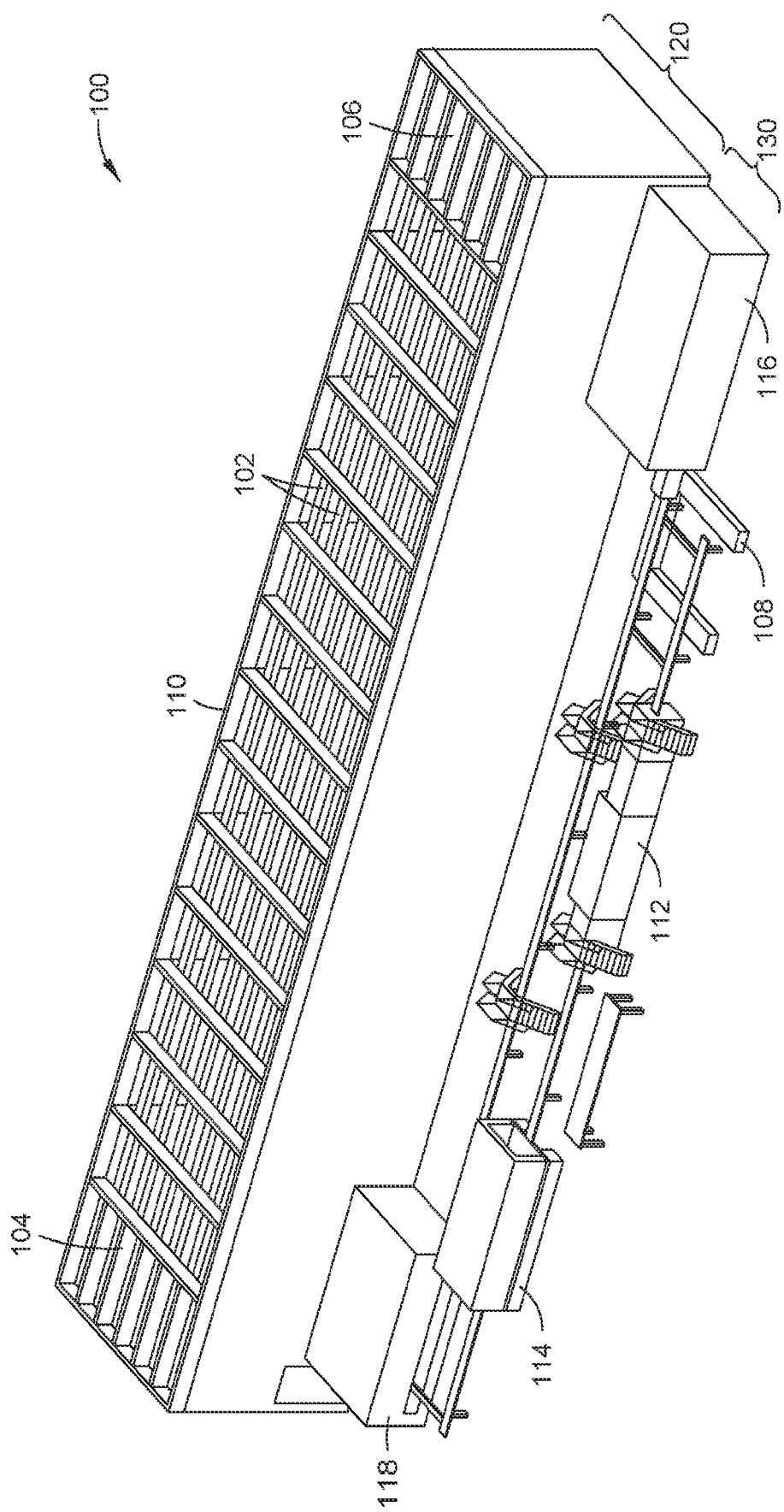
FIG. 1 illustrates a schematic perspective view of a controlled environment agriculture system according to an embodiment of the disclosure.

FIG. 1 illustrates a schematic perspective view of a controlled environment agriculture system 100. The system 100 is configured for high-density growth and crop yield and includes an environmentally controlled growing chamber 120 and a vertical tower conveyance system 110 disposed within the growing chamber 120. The conveyance system 110 is operable to convey grow towers 150, described in greater detail with respect to FIG. 2, with crops/plants therein through the growing chamber 120. The crops or plants grown within the system 100 may exhibit gravitropic, geotropic, and/or phototropic growth characteristics. The crops or plants may vary considerably and include, but are not limited to, leaf vegetables, fruiting vegetables, flowering crops, fruits, and tubers, among others. The system 100 may be configured to grow a single crop or plant type at a time or grow multiple crop or plant types concurrently.

The system 100 also includes additional conveyance systems, such as a central processing system 130, for moving the grow towers in a circuit or pathway within the system 100 throughout the crop or plant growth cycle. The central processing system 130 includes one or more conveyance mechanisms for directing grow towers to stations for loading plant plugs into, and harvesting crops from, the grow towers. For example, the central processing system 130 includes a harvester station 108, a washing station, 112, and a transplanter station 114. The harvester station 108 removes crops from the grow towers and deposits harvested crops into food-safe containers which may then be conveyed to post-harvest facilities (e.g. preparation, washing, packaging, storage, etc.).

In the illustrated embodiment, various stations of the central processing system 130 operate on grow towers disposed in a horizontal orientation. A pick-up station 118, and associated control logic, includes a robot operable to releasably grasp a grow tower oriented horizontally from a loading location, rotate the grow tower into a vertical orientation, and attach the grow tower to a transfer station for insertion into a selected grow line 102 of the growing chamber 120. At the other end of the growing chamber 120, a laydown station 116, and associated control logic, is operable to releasably grasp and move a vertically oriented grow tower from a buffer region, rotate the grow tower to a horizontal orientation, and position the grow tower on a conveyance system for loading into the harvester station 108. The stations 118, 116 each include a robotic arm, such as a six-degree of freedom robotic arm with end effectors for grasping the grow towers.

The growing chamber 120 also includes automated loading and unloading mechanisms for inserting grow towers into selected grow lines 102 and unloading grow towers from the grow lines 102. In one implementation, a load transfer conveyance mechanism 104 includes a powered and free conveyor system that conveys carriages loaded with grow towers from the pick-up station 118 to a selected grow line 102. The load transfer conveyance mechanism 104 also includes one or more actuators that push the grow towers onto a grow line 102. Similarly, an unload transfer conveyance mechanism 106 includes one or more actuators that push or pull the grow towers from the grow lines 102 into a carriage of another powered or free conveyor mechanism, which conveys the carriages from the grow line 102 to the laydown station 116.

The circuit or pathway includes a staging area for loading the grow towers into and out of the conveyance system 110. The conveyance system 110 within the growing chamber 120 is configured to suspend or otherwise support and translate one or more grow towers along a plurality of grow lines 102. Each grow tower is configured to contain plant growth media that supports a root structure of at least one crop or plant growing therein. The grow towers releasably attach to the grow lines 102 in a substantially vertical orientation and move along the grow lines 102 during a growth phase of the plant. The conveyance system 110 and central processing system 130 are arranged in a production circuit under the control of one or more computing and/or control systems.

The growing chamber 120 includes light emitting sources positioned at various locations along and between the grow lines 102 of the conveyance system 110. The light emitting sources can be positioned laterally relative to the grow towers in the grow lines 102 and configured to emit light toward faces of the grow towers that include openings from which the plants grow. In one example, the light emitting sources are light emitting diodes (LED). The light emitting sources may be a plurality of LEDs arranged in a bar-like structure which is positioned in a vertical orientation to emit light laterally along an entire length of the grow tower. Multiple LED light bar structures are arranged in the growing chamber 120 along and between the grow lines 102. Other lighting configurations are also contemplated. For example, the LED light bar structures may be arranged horizontally between the grow lines 102. In certain embodiments, the LED light bar structures are water-cooled.

The growing chamber 120 also includes a nutrient supply system configured to supply an aqueous crop nutrient solution to the crops disposed in the grow towers as the grow towers translate through the growing chamber 120. The nutrient supply system provides an aqueous crop nutrient solution to a top of the grow towers and gravity causes the nutrient solution to travel down the vertically-oriented grow towers to the crops disposed along a length of the grow towers.

The growing chamber 120 also includes an airflow source which is configured to direct airflow in a direction lateral to growth of the crops and through an under-canopy of each plant to disturb a boundary layer of the under-canopy of the plant. In another implementation, airflow is directed from the top of the canopy or orthogonal to the direction of plant growth. The growing chamber 120 also includes a control system and associated sensors for regulating at least one growing condition, such as air temperature, airflow velocity, relative air humidity, and ambient carbon dioxide gas content. The control system may further include sub-systems such as HVAC units, chillers, fans, and associated ducting and air handling apparatus.

The grow towers include various identifying attributes, such as bar codes or radio frequency identification (RFID) tags, to enable sensing and location detection of each grow tower. The system 100 includes corresponding sensors and programming logic for tracking the grow towers during various stages of the crop production cycle and for controlling one or more conditions of the growth environment. The operation of the controls systems and the length of time the grow towers remain in the growth environment can vary depending on a variety of factors, such as crop type, desired crop maturity, and the like.

In operation, grow towers, with newly transplanted crops or seedlings disposed therein, are transferred from the central processing system 130 into the conveyance system 110. The conveyance system 110 moves the grow towers to predefined positions along respective grow lines 102 within the growing chamber 120 in a controlled manner. Within the growing chamber 120, the crops disposed in the grow towers are exposed to the controlled conditions of the growth environments, such as light, temperature, humidity, airflow, nutrient supply, etc. The control systems of the controlled environment agriculture system 100 are capable of automated adjustments to the growth environment to improve growing conditions and improve various crop attributes, such as crop yields, crop visual appeal, and crop nutrient content. When the crops are ready for harvesting, the grow towers are transferred from the conveyance system 110 to the central processing system 130 for harvesting and other processing operations.

FIG. 2 illustrates a perspective view of a portion of the grow line 102 with the grow towers 150 according to an embodiment of the disclosure. As illustrated, a plurality of the grow towers 150 are arranged in parallel along the grow line 102. Each grow tower 150 includes a plurality of grow sites 154 distributed along opposing faces of the grow tower 150. In operation, the transplanter station 114 transplants seedlings into empty grow sites 154 of the grow towers 150 where the seedlings remain and mature until the plant is ready for harvesting. The grow line 102 supports the plurality of grow towers 150 and the grow line 102 is supported by a bracket 202 which may be coupled to a superstructure, such as a frame or a facility structure. Hooks 152 couple the grow tower 150 to the grow line 102 and support the grow towers 150 in a vertical orientation as the grow towers 150 are translated along the grow line 102. A conveyance mechanism 204 engages the hooks 152 to enable movement of the grow towers 150 along the grow line 102.

Figure 3A:
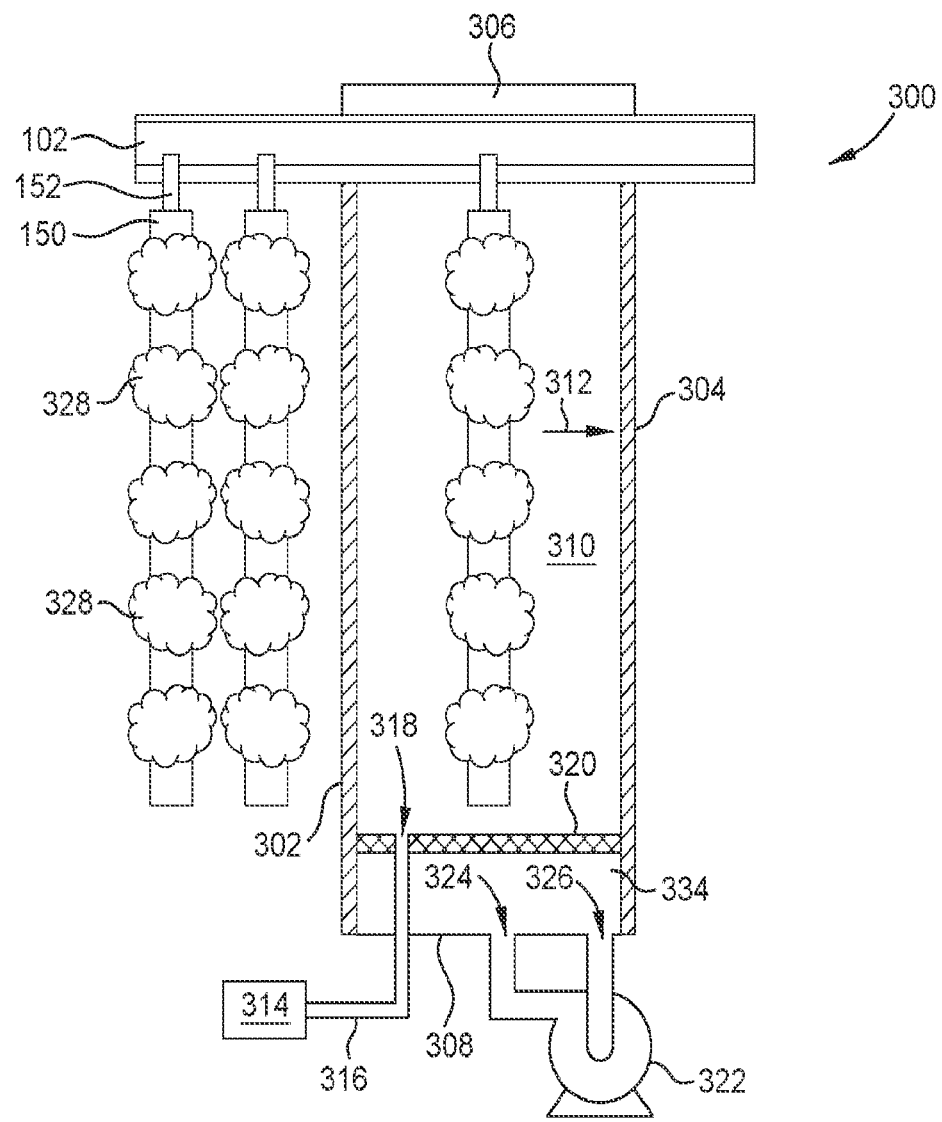
FIG. 3A illustrates a schematic side view of a pollination system according to an embodiment of the disclosure.

FIG. 3A illustrates a schematic side view of a pollination system 300 according to an embodiment of the disclosure. The illustrated system 300 includes the grow line 102 and grow towers 150 coupled to the grow line 102 by hooks 152. Plants 328 are illustrated as growing in the grow towers 150. In one embodiment, the plants 328 are flowering or fruiting plants, such as strawberry plants or many other similar types of plants, which are to be pollinated to facilitate fruit production. It is contemplated while fruiting plants are described above, various other types of plants, such as vegetables and the like are contemplated as benefitting from the disclosure provided herein.

As the grow towers 150 move along a travel path 312, the grow towers 150 and plants 328 move into a volume 310 of the pollination system 300. The volume 310 is defined by a first wall 302, a second wall 304, a base 308, and a ceiling 306. Third and fourth walls, 330, 332 (illustrated in FIG. 3B) are contemplated as fully enclosing the volume 310. While the embodiments described herein illustrate a rectangular prism or cubic volume, it is contemplated that any desirable shape of the volume 310 is within the scope of this disclosure. The walls 302, 304, base 308, and ceiling 306 are fabricated from various materials suitable for isolating the volume 310 from the surrounding environment. More specifically, the materials selected for the walls 302, 304, the base 308, and the ceiling 306 are contemplated to be impervious to particles the size of pollen or smaller. For example, such materials are solid polymeric sheets, such as plastic or the like. In one embodiment, the materials are substantially translucent, however, it is contemplated that the materials may have any desired degree of opacity, depending upon the desired implementation.

In operation, the grow tower 150 enters the volume 310 through the first wall 302 along the travel path 312. A pollination process is performed while the grow tower 150 is disposed within the volume 310 and then the grow tower 150 exits the volume 310 through the second wall 304. While one grow tower is illustrated as being in the volume 310, it is contemplated that the volume 310 is sized to accommodate a plurality of grow towers 150 at the same time. The first wall 302 and second wall 304 include an opening (not illustrated) through which the grow tower 150 travels. In one embodiment, the opening is one or more sliding doors or the like which are operable to open and close. In this embodiment, the doors are disposed within the travel path 312 such that opening the one or more doors enables the grow tower 150 to pass through the one or more doors into the volume 310. In one embodiment, the one or more doors open horizontally. Alternatively, the one or more doors may open in a vertical manner.

In another embodiment, openings disposed in the first wall 302 and second wall 304 are "opened" and "closed" by utilization of an air curtain or the like. In this embodiment, air curtain flow generators, such as blowers, fans, or the like, are disposed in-line with the first wall 302 and second wall 304 adjacent to one or both of the base 308 and the ceiling 306. The flow generators operate to generate an air curtain which isolates the volume 310 from the surrounding environment. It is contemplated that the flow generators are deactivated when the grow towers 150 traverse through the first and second walls 302, 304. During a pollination process, the flow generators are activated to generate an air curtain which retains pollen within the volume 310. Examples of doors and air curtains which may be advantageously implemented in accordance with the embodiments described herein are illustrated and described in U.S. Patent Application Ser. No. 63/055,115, the entirety of which is herein incorporated by reference.

The pollination system 300 also includes a pollen source 314, a blower 322 and a screen 320. The pollen source 314 is a source, container, or other vessel which holds a reservoir of pollen. The pollen source 314 is in fluid communication with the volume 310 via a conduit 316. The conduit 316 extends from the pollen source 314 and through the base 308 to an opening 318 formed in the screen 320. In one embodiment, the pollen source 314 includes a blower, pump, or other fluid flow or pressure inducing device operable to move pollen from the pollen source 314 into the volume 310.

The blower 322 is in fluid communication with the volume 310 via a fluid inlet 326 formed in the base 308 and a fluid outlet 324 formed in the base 308. In operation, pollen is initially delivered to the volume 310 by the pollen source 314. The blower 322 creates a fluid flow within the volume 310 to circulate the pollen through the volume 310. The blower 322 recirculates a fluid, such as air, an inert gas, or other gas species, by removing the fluid from the volume 310 via the fluid inlet 326 and delivering the fluid back to the volume 310 through the fluid outlet 324. In this manner, the environmental constituents of the volume 310 can be more precisely controlled to facilitate an advantageous environment for pollination of the plants 328. Alternatively, the blower 322 is connected to an outside gas source to introduce "new" gas into the volume 310.

In one embodiment, the ceiling 306 includes a fan or blower to further facilitate distribution of pollen within the volume 310. In this embodiment, the blower 322 and fan or blower in the ceiling 306 are operated sequentially or simultaneously, depending upon the desired fluid flow within the volume 310.

The pollination process is performed for an amount of time sufficient to enable pollination of all or substantially all plants 328 disposed on the grow towers 150. In one embodiment, the pollination process is performed for an amount of time of between about 10 seconds and about 60 minutes, between about 1 minute and about 50 minutes, between about 2 minutes and about 40 minutes, between about 3 minutes and about 30 minutes, between about 4 minutes and about 20 minutes, and between about 5 minutes and about 10 minutes. The amount of pollen utilized during the pollination process is between about 1 microgram and about 1 kilogram, such as between about 1 gram and about 100 grams of pollen. The amount of pollen utilized and the duration of pollination are contemplated as being complimentary, for example, the greater the amount of pollen utilized, the less amount of pollination time is utilized, and vice versa.

In one embodiment, the screen 320 is selected with a mesh size small enough to prevent the passage of pollen therethrough while still enabling fluid flow therethrough. For example, a mesh size of the screen 320 is between about 1 µm and about 100 µm. It is contemplated the mesh size is selected based upon the type of plant 328 being pollinated as different types of plants have different sizes of pollen grains. The screen 320 prevents or substantially reduces pollen from being ingested by the blower 322 such that pollen remains substantially within the volume 310 and not in the plenum 334 between the screen 320 and the base 308.

In one embodiment, the screen 320 is a wire mesh or the like. In another embodiment, the screen 320 is a knit fabric or the like. In another embodiment, the screen 320 is a fibrous mat or the like. It is contemplated that various other materials may be utilized for the screen 320 which are suitable for facilitating fluid flow through the material while preventing or substantially reducing the passage of pollen therethrough. Although the screen 320 is illustrated as being spaced apart from the base 308, in one embodiment the screen 320 is disposed in contact with the base 308 such that there is not a plenum between the base 308 and the screen 320. In one embodiment, the screen 320 is optional. In this embodiment, the conduit 316 extends from the pollen source 314 to the base 308 and thus, the volume 310.

Figure 3B:
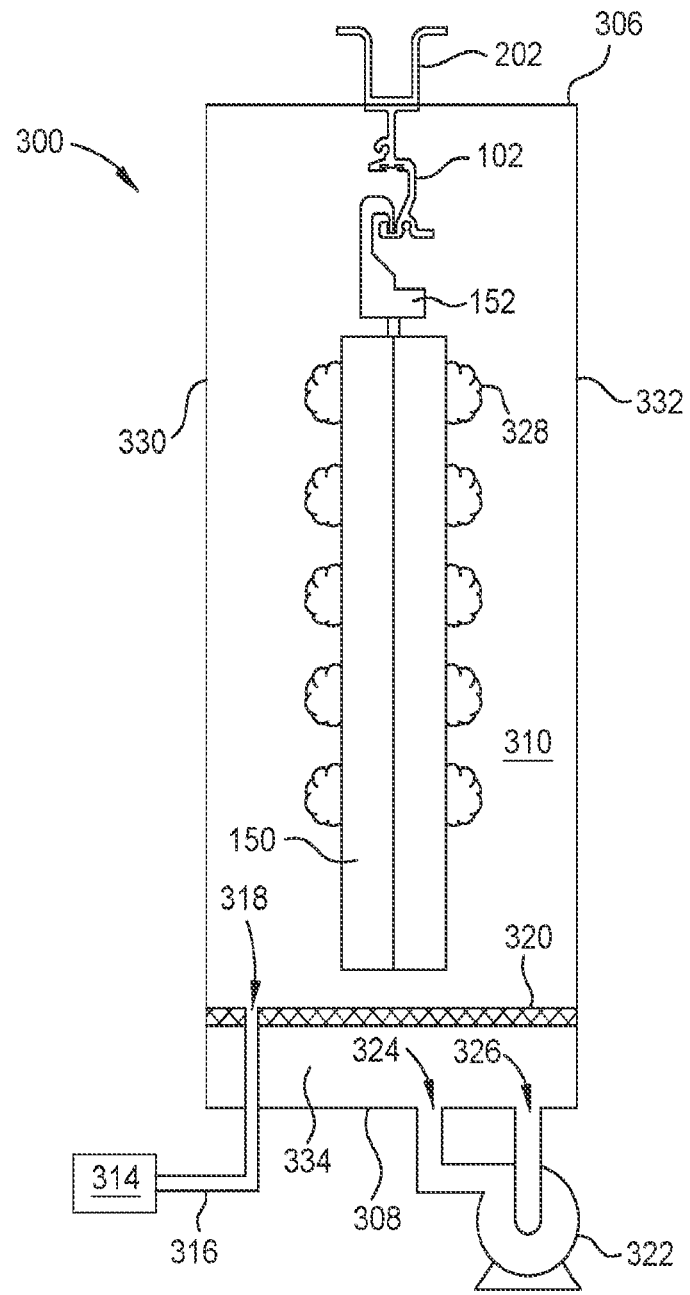
FIG. 3B illustrates a schematic end view of the pollination system of FIG. 3A according to an embodiment of the disclosure.

FIG. 3B illustrates a schematic end view of the pollination system 300 of FIG. 3A according to an embodiment of the disclosure. This view illustrates the third wall 330 and the fourth wall 332 as being disposed opposite and parallel to one another. In one embodiment, the third and fourth walls 330, 332 are perpendicular to the first and second walls 302, 304. Although such a description illustrates a rectangular prism or cubic volume 310, any number of other walls may be utilized to form the volume 310 with any desired shape. In embodiments where a non-rectangular prism or cubic volume 310 is utilized, the base 308 and ceiling 306 are shaped and sized to accommodate the configuration of the walls to fully enclose the volume 310.

In the illustrated embodiment, the grow tower 150 is disposed within the travel path 312 and openings in the first and second walls 302, 304 are disposed behind and in front of the grow tower 150, respectively, as the grow tower 150 travels along the path 312. In one embodiment, the ceiling 306 is disposed above the grow line 102. For example, the ceiling 306 is coupled at or adjacent to the bracket 202. However, it is contemplated the ceiling 306 may be disposed an any location above the grow line 102 to prevent interference with the hooks 152 traversing along the grow line 102.

Figure 4A:
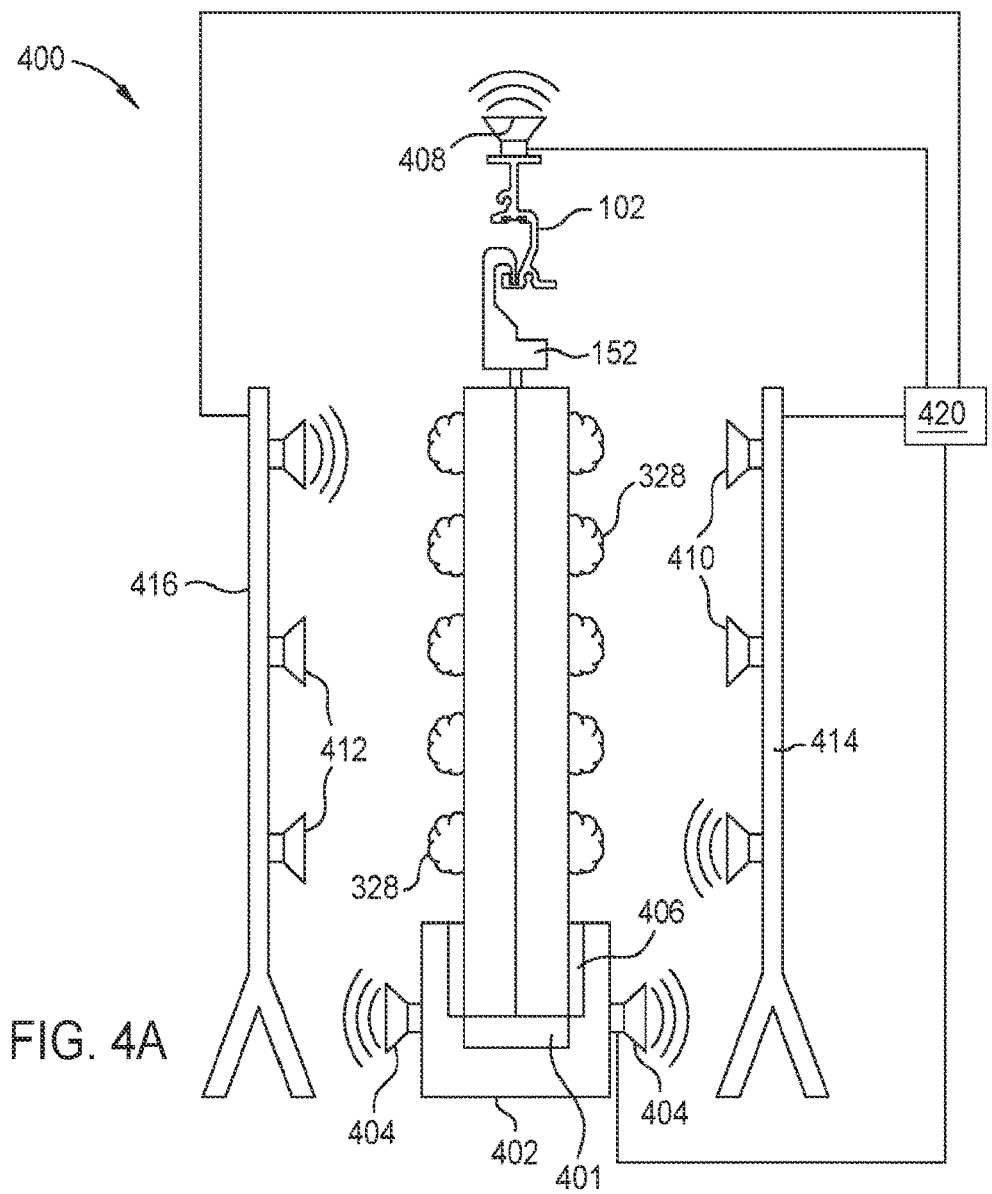
FIG. 4A illustrates a schematic end view of a pollination system according to an embodiment of the disclosure.

FIG. 4A illustrates a schematic end view of a pollination system 400 according to an embodiment of the disclosure. The pollination system 400 includes one or more vibration generators 404, 408, 410, 412 which are configured to induce vibration of one or both of the grow tower 150 and the plants 328. In one embodiment, a gutter 402 is disposed adjacent to an end of the grow tower 150 opposite the hook 152, for example, the bottom of the grow tower 150. A first vibration generator 404 is coupled to the gutter 402 and the first vibration generator 404 is configured to induce vibration of the gutter 402. The gutter 402 is a U-shaped member which defines a channel 401 therein. The channel 401 is sized to accommodate the grow tower 150 therein and enable the grow tower 150 to traverse along the travel path 312 through the gutter 402. The gutter 402 is fabricated from suitable materials, including polymeric materials, metallic materials, or other materials which are capable of translating vibratory motion therethrough.

In one embodiment, the gutter 402 is disposed in physical contact with the grow tower 150. In another embodiment, the gutter 402 is disposed in close proximity with the grow tower 150. In this embodiment, a width of the channel 401 is between about 0.1 cm and about 10 cm greater than a width of the grow tower 150. In one embodiment, a width of the channel 401 is operable to widen or narrow. In one example, the gutter 402 is capable of widening to facilitate passage of the grow tower 150 therethrough and narrowing to contact the grow tower 150 during a pollination process.

In one embodiment, a damper 406 is disposed within the gutter 402. The damper 406 is coupled to the gutter 402 adjacent a region of the channel 401 where the grow tower 150 traverses. In one embodiment, the damper 406 is disposed within the gutter 402 such that the damper 406 and gutter 402 are substantially co-planar when defining a vertical side of the channel 401. In another embodiment, the damper 406 is coupled to the gutter 402 and extends laterally inward from the gutter 402 into the channel 401 to narrow a width of the channel 401. In another embodiment, the damper 406 is moveable in a lateral direction to widen or narrow the gutter 402. In this embodiment, the gutter 402 has a width greater than a width of the grow tower 150 and the damper 406 is in a first position when enables passage of the grow tower 150 into the gutter 402. The damper 406 is then actuated to a second position where the damper 406 engages or otherwise contacts the grow tower 150 to facilitate a vibration induced pollination process.

In one embodiment, the damper 406 is fabricated from the same or similar material as the gutter 402. In this embodiment, vibratory motion or energy from the first vibration generator 404 via the gutter 402 is translated through the damper 406 to the grow tower 150 with substantially the same magnitude. In another embodiment, the damper 406 is fabricated from a vibration absorbing material, such as a rubber material or other similar material. In this embodiment, vibratory motion or energy from the first vibration generator 404 via the gutter 402 is translated through the damper 406 with a reduced magnitude.

In another embodiment, the damper 406 is selected from a material having a low coefficient of friction to enable translation of the grow tower 150 along the damper 406 while remaining in contact with the damper 406. Examples of such low coefficient of friction materials include various polymeric materials, such as polytetrafluoroethylene and other similar materials. Such materials enable physical contact between the damper 406 and the grow tower 150 to facilitate the transfer of vibrator motion or energy from the first vibration generator 404 to the grow tower 150 while enabling the grow tower 150 to slide through the channel 401 substantially in contact with the damper 406. Alternatively, surfaces of the gutter 402 which define the channel 401 may be coated with a low coefficient of friction material or a vibration absorbing material, depending upon the desired implementation. In these examples, the damper 406 is optional.

The first vibration generator 404 is coupled to the gutter 402 and configured to generate vibratory motion or energy. It is contemplated that one or a plurality of first vibrations generators 404 may be utilized in accordance with the embodiments described herein. In one embodiment, the first vibration generator 404 is an acoustic vibration generator, such as a speaker or the like, for example, a subwoofer. In other embodiments, the first vibration generator 404 is a mechanical vibration generator, a magnetic vibration generator, a pneumatic vibration generator, an electric vibration generator, electro-mechanical vibration generator, piezoelectric vibration generator, ultrasonic vibration generator, or other type of vibration generation apparatus.

Vibration of the grow tower 150 created by the first vibration generator 404 is selected with a magnitude sufficient to dislodge pollen grants from the flowers of the plants 328. However, the magnitude of vibration is also selected to prevent damage to the plant 328 or the grow tower 150 and grow line 102. In one embodiment, the frequency of vibration generated by the first vibration generator 404 is between about 20 Hz and about 20 kHz. In one embodiment, vibration of the grow tower 150 by the first vibration generator 404 is performed in a continuous manner. Alternatively, vibration of the grow tower 150 by the first vibration generator 404 is performed in a pulsed manner. The duration of vibration is between about 1 second and about 5 minutes, for example, between about 5 seconds and about 4 minutes, between about 10 seconds and about 3 minutes, between about 15 seconds and about 2 minutes, between about 20 seconds and about 1 minute, or between about 25 seconds and about 45 seconds.

In operation, vibratory motion or energy transferred from the first vibration generator 404 to the grow tower 150 causes pollen grains from the plants 328 to dislodge and become airborne. The pollen grains migrate to adjacent plants 328 or fall downward onto plants 328 along the grow tower 150. As such, pollen grains from one plant are able to pollinate another plant disposed within the grow tower 150.

In one embodiment, the system 400 includes a second vibration generator 408. The second vibration generator 408 is coupled to the grow line 102. In one embodiment, the second vibration generator 408 is coupled to the grow line 102 opposite the gutter 402. Similar to the first vibration generator 404, the second vibration generator 408 is configured to induce vibratory motion or energy within the system 400 and vibrate or oscillate the grow tower 150. The second vibration generator 408 is the same or similar type of vibration generator as described with regard to the first vibration generator 404. The vibratory motion or energy is transferred from the second vibration generator 408 through the grow line 102 and hook 152 to the grow tower 150. The second vibration generator 408 is utilized with similar frequencies, durations, and operational implementations as the first vibration generator 404. As described in detail with regard to FIG. 4B, the second vibration generator 408 may include a plurality of vibration generators coupled to the grow line 102.

In another embodiment, the system 400 includes third and fourth vibration generators 410, 412. The third and fourth vibration generators 410, 412 are coupled to first and second stands 414, 416, respectively. The stands 414, 416 are spaced apart from the and out of physical contact with the grow tower 150 or the grow line 102. In one embodiment, the first stand 414 is positioned adjacent to a first side of the grow tower 150 and the second stand 416 is positioned on a second side of the grow tower 150 opposite the first stand 414. In one embodiment, a length of the stands 414, 416 is similar to a length of the grow tower 150. However, the length of the stands 414, 416 may also be shorter or longer than the length of the grow tower 150.

One or more third vibration generators 410 are coupled to the third stand 414. The third vibration generators 410 are distributed along a vertical length of the first stand 414. While three third vibration generators 410 are illustrated, any number of vibration generators with any spacing along the first stand 414 are contemplated as being within the scope of this disclosure. Similarly, one or more fourth vibration generators 412 are coupled to the fourth stand 416. The fourth vibration generators 412 are distributed along a vertical length of the second stand 416. While three fourth vibration generators 412 are illustrated, any number of vibration generators with any spacing along the second stand 416 are contemplated as being within the scope of this disclosure.

In one embodiment, the third and fourth vibration generators 410, 412 are acoustic vibration generators, such as a subwoofer or other device which utilizes sound waves to induce vibration of the grow tower 150. Other type of vibration generators which do not utilize physical contact to induce vibration of the grow tower 150 may also be implemented as the vibration generators 410, 412. The sequence of operation the third and fourth vibration generators 410, 412 is selected to facilitate pollination of the plants 328 disposed in the grow tower 150 by dislodging pollen grains from the plants 328 and facilitating transfer of the dislodged pollen grains to other plants within the tower, thus facilitating pollination.

In one embodiment, the system 400 includes a controller 420. The controller 420 includes, but is not limited to, a central processing unit (CPU), memory, and support circuits. The CPU may be one of any form of computer processor used in industrial settings for controlling various system functions, such as activation and deactivation of the vibration generators 404, 408, 410, 412, coordination and control of system processes, and support hardware (e.g., sensors, robots, motors, actuators, etc.), and process monitoring. The memory is connected to the CPU, and may be one or more of a readily available memory, such as random access memory (RAM), read only memory (ROM), floppy disk, hard disk, solid state, flash memory, magnetic memory, or any other form of digital storage, local or remote. Software instructions and data are coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the controller 420 determines operation of the vibration generators 404, 408, 410, 412. The program is software readable by the controller 420 that includes code to perform tasks relating to activation, deactivation, monitoring, sequencing, and coordination of the vibration generators 404, 408, 410, 412 with other aspects of the system 400. For example, the controller 420 includes program code that synchronizes activation and deactivation of the vibration generators 404, 408, 410, 412 to enable vibratory motion or energy inducement of the grow towers 150 to facilitate pollination of plants 328 disposed in the grow towers 150. In another example, the controller 420 includes program code which analyzes input from cameras or sensors to coordinate activation and deactivation of the vibration generators 404, 408, 410, 412 depending upon the desired degree of pollination.

Figure 4B:
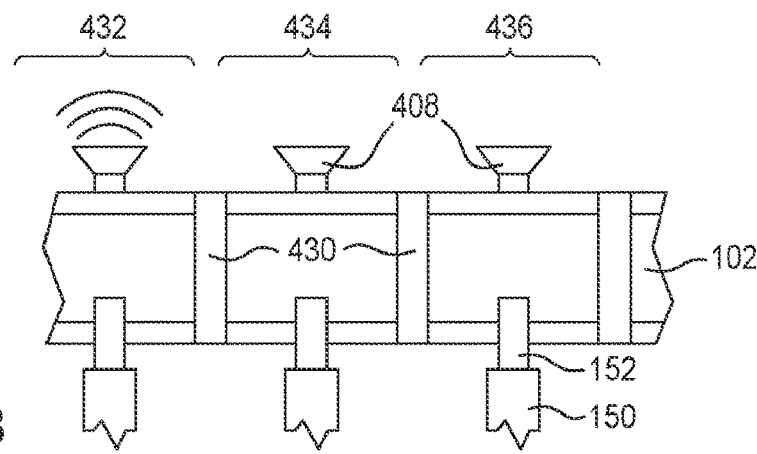
FIG. 4B illustrates a detailed view of a grow line and vibration generator of the pollination system of FIG. 4A according to an embodiment of the disclosure.

FIG. 4B illustrates a detailed view of the grow line 102 and second vibration generator 408 of the pollination system 400 of FIG. 4A according to an embodiment of the disclosure. In the illustrated embodiment, a plurality of second vibration generators 408 are coupled to the grow line 102. A plurality of grow towers 150 are also illustrated as being coupled to the grow line 102 in a plurality of regions 432, 434, 436. A second vibration generator 408 is coupled to the grow line 102 in each of the regions 432, 434, 436. In operation, the second vibration generators 408 induce vibratory motion or energy of the grow towers 150 via physical contact between the grow towers 150, the hook 152, the grow line 102, and the second vibration generators 408.

In one embodiment, a plurality of isolators 420 are disposed within the grow line 102. The isolators 420 are of the same size, shape, and morphology as the grow line 102 but are fabricated from a vibration absorbing or isolating material, such as a rubber or polymeric material. The isolators 430 prevent or substantially reduce vibration of grow towers 150 in regions adjacent to a region where the second vibrations generator 408 is actively inducing vibration. For example, if the vibration generator 408 in a second region 434 is activated, the isolators 430 between the second region 434 and a first region 432 and a third region 436 adjacent to the second region 434 substantially reduce or eliminate vibration experienced by the grow towers 150 in the first and third regions 432, 436. As such, enhanced vibration control is enabled.

It is contemplated that the various regions 432, 434, 436 and vibration generators 408 in each region are operable induce not only vibration and pollination of plants 328 within a single grow tower 150, but also enable pollination between plants 328 of adjacent grow towers 150. The movement of grow towers 150 along the grow line 102 is also utilized to influence pollination. For example, as grow towers 150 are vibrated and pollen is liberated from the plants 328 into the surrounding environment, the grains of pollen may remain suspended within the air depending upon the air flow and other environmental influences. The grow towers 150 may be moved through the suspended pollen grains and the probability for pollination is increased as more plants are exposed to the pollen.

Figure 5:
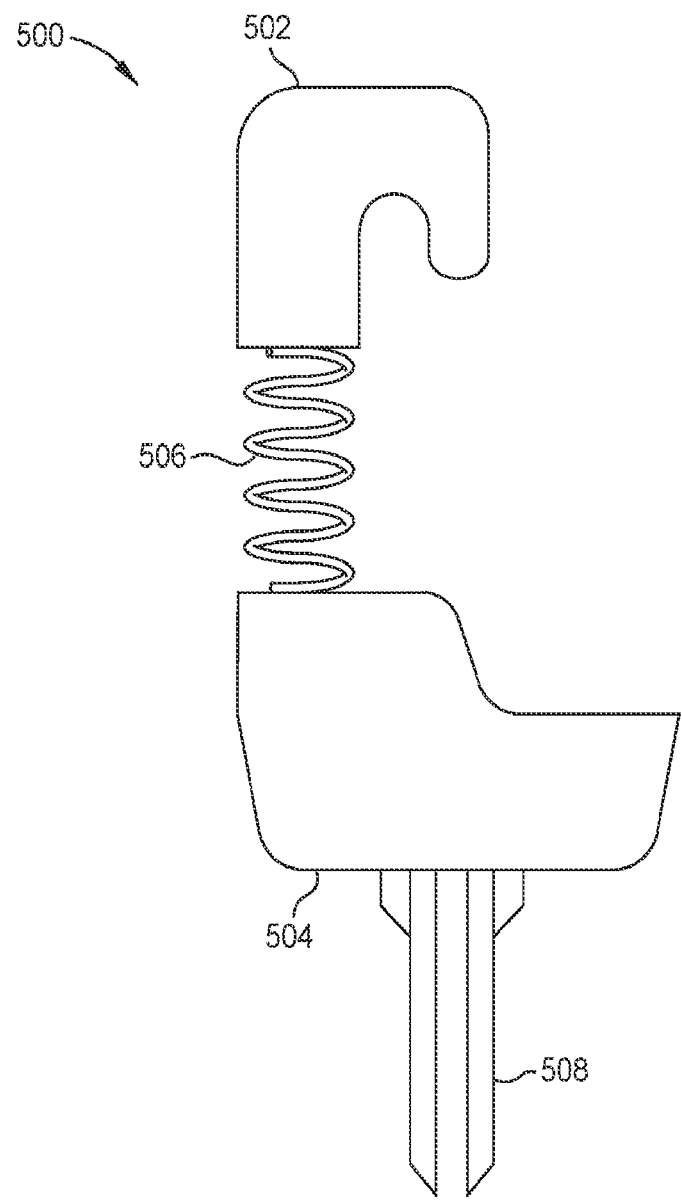
FIG. 5 illustrates a side view of a grow tower hook according to an embodiment of the disclosure.

FIG. 5 illustrates a side view of a grow tower hook 500 according to an embodiment of the disclosure. The hook 500 is utilized to couple the grow tower 150 to the grow line 102 similar to the hook 152 described with regard to FIG. 2. The hook 500 includes a first portion 502 and a second portion 504. A spring 506 is disposed between the first portion 502 and the second portion 504. The spring 506 is coupled to each of the first portion 502 and the second portion 504. In one embodiment, the spring 506 is a coil spring fabricated from a metallic or polymeric material. In another embodiment, the spring 506 is a cord, rope, tube or the like fabricated from an elastomeric material. A length of the spring 506 in an equilibrium position with a grow tower 150 attached to the hook 500 is between about 1 inch and about 12 inches, such as between about 3 inches and about 9 inches, for example about 6 inches.

A flange 508 extends from the second portion 504 and the flange 508 registers with the grow tower 150 to substantially center the hook 500 a provide additional sites to couple or otherwise attach the hook 500 to the grow tower 150.

Figure 6A:
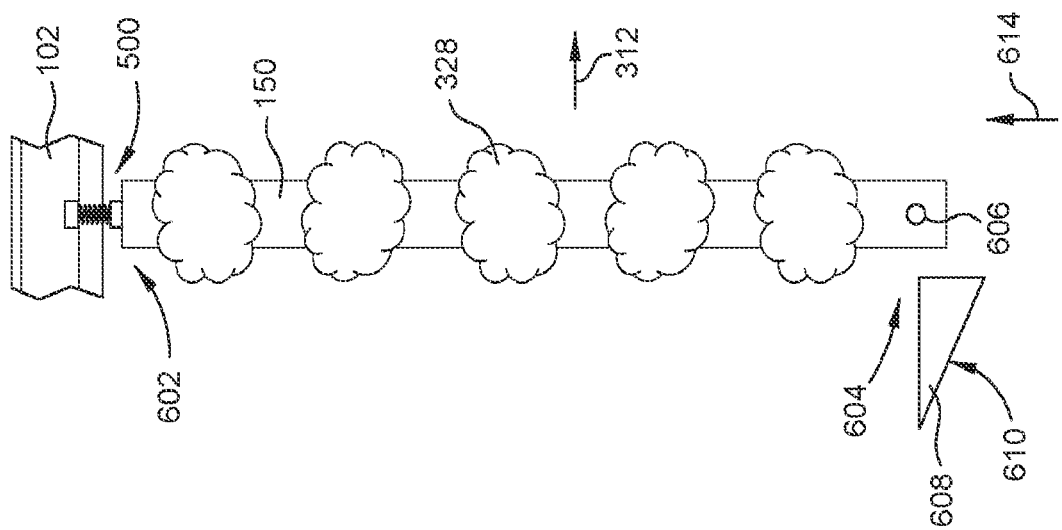
FIG. 6A illustrates a pollination system utilizing the grow tower hook of FIG. 5 in a first position according to an embodiment of the disclosure.

FIG. 6A illustrates a pollination system utilizing the grow tower hook 500 of FIG. 5 in a first position according to an embodiment of the disclosure. The position illustrated in FIG. 6A depicts the spring 506 of the hook 500 in an equilibrium position. The hook 500 is coupled between a top end 602 of the grow tower 150 and the grow line 102. A peg 606 is coupled to and extends outward from the grow tower 150 adjacent to a bottom end 604 of the grow tower 150 which is opposite the top end 602. The peg 606 extends laterally from the grow tower 150 and is integrally formed with the grow tower 150 or fixably coupled to the grow tower 150.

A wedge 608 or other similar structure is positioned adjacent to the bottom end 504 of the grow tower 150. The wedge 608 is disposed in a fixed position substantially within the travel path 312 of the peg 606. The wedge 608 includes a surface 610 which is angled with respect to a horizontal datum plane. The surface 610 is disposed at a first elevation at an upstream position along the travel path 312 and a second elevation lower than the first elevation at a downstream positon along the travel path 312.

Figure 6B:
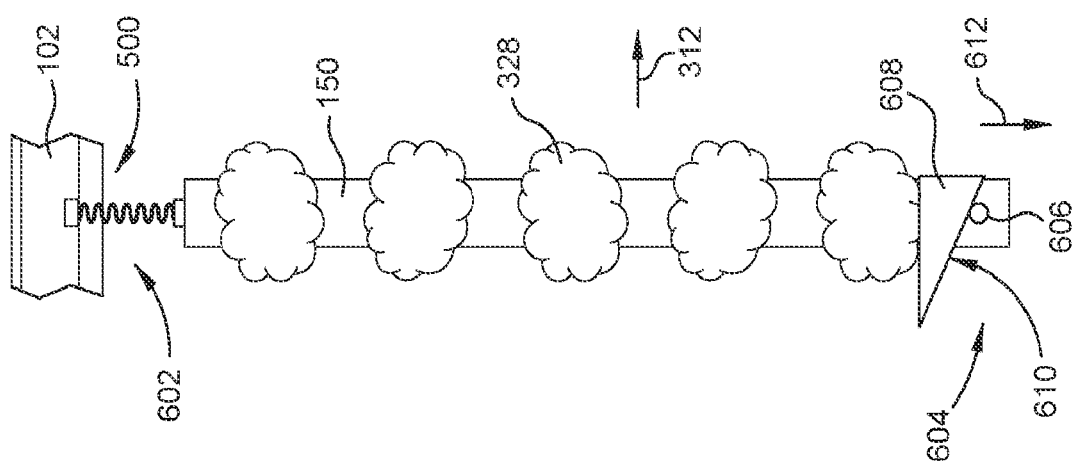
FIG. 6B illustrates the pollination system of FIG. 6A utilizing the grow tower hook of FIG. 5 in a second position according to an embodiment of the disclosure.

FIG. 6B illustrates the pollination system of FIG. 6A utilizing the grow tower hook 500 of FIG. 5 in a second position according to an embodiment of the disclosure. The position illustrated in FIG. 6B depicts the spring 506 of the hook 500 in an extended displaced position. As the grow tower 150 is moved along the travel path 312, the peg 606 engages the surface 610 of the wedge 608 which causes the grow tower 150 to be pushed in a downward direction 612 as the grow tower 150 continues along the travel path 312. The downward movement of the grow tower 150 extends the spring 506 of the hook 500.

Figure 6C:
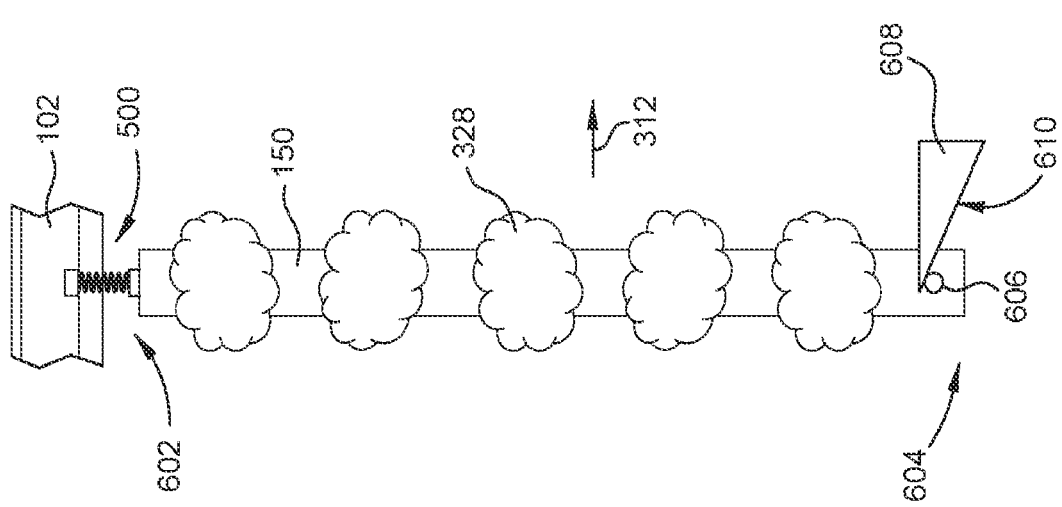
FIG. 6C illustrates the pollination system of FIG. 6A utilizing the grow tower hook of FIG. 5 in a third position according to an embodiment of the disclosure.

FIG. 6C illustrates the pollination system of FIG. 6A utilizing the grow tower hook 500 of FIG. 5 in a third position according to an embodiment of the disclosure. The position illustrated in FIG. 6C depicts the spring 506 of the hook 500 in a compressed position. As the grow tower 150 is moved further along the travel path 312, the peg 606 disengages with the surface 610 of the wedge 608. Upon disengagement, the spring 506 of the hook 500 causes the grow tower 150 to move in an upward direction 614. The movement in the upward direction 614 from the position illustrated in FIG. 6B causes the spring 506 of the hook 500 to extend and compress repeatedly until the spring equilibrium is reestablished.

The extension and compression cycling of the spring 506 causes a shaking motion of the grow tower 150. The shaking motion is in a substantially vertical direction, however, lateral movement of the grow towers 150 is also induced which may cause adjacent grow towers 150 to strike one another causing further vibration of the grow tower 150. Such shaking, oscillation, and vibration of the grow tower 150 causes pollen to be dislodged from plants 328 disposed in the grow tower 150. The dislodged pollen can then fall down or float to other plants within the grow tower 150 or to other grow towers. As such, the plants 328 of the grow towers 150 are pollinated by the system illustrated in FIG. 6A-6C.

Figure 7:
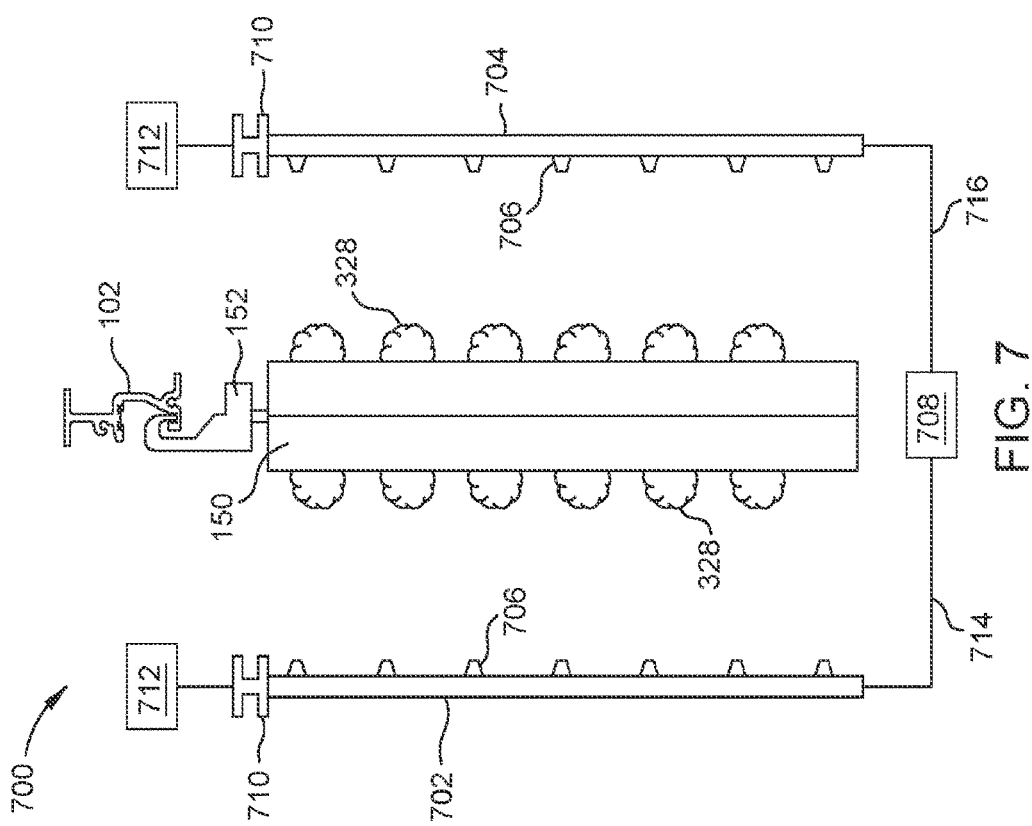
FIG. 7 illustrates an end view of a pollination system according to an embodiment of the disclosure.

FIG. 7 illustrates an end view of a pollination system 700 according to an embodiment of the disclosure. The system 700 includes a plurality of emitters 702, 704 having nozzles 706, a pollen source 708 in communication with the nozzles 706 via the emitters 702, 704, a plurality of rails 710 coupled to the emitters 702, 704, and motors 712 in communication with the emitters 702, 704. A first emitter 702 is disposed adjacent to a first side of the grow tower 150 and a second emitter 704 is disposed adjacent to a second side of the grow tower 150 opposite the first emitter 702. Each of the emitters 702, 704 is coupled to and suspended from a rail 710 which provides support for the emitters 702, 704. The rails 710 extend along both sides of the grow tower 150. In one embodiment, the rails 710 are disposed in the same or similar plane as the hook 150. In another embodiment, the rails 710 are disposed in the same or similar plane as the grow line 102. Alternatively, the emitters 702, 704 may be coupled to the other apparatus, such as the bracket 202 or other structural members within the system 100.

The emitters 702, 704 are a hollow member, such as a tube or the like, which have the plurality of nozzles 706 coupled thereto. The nozzles are configured to spray or disperse pollen in a direction toward the grow tower 150 where the plants 328 are positioned. The nozzles 706 are distributed along the emitters 702, 704 in any desired spacing or number. In one embodiment, a nozzle 706 is positioned adjacent to each plant 328 disposed in the grow tower 150. It is contemplated that a greater or lesser number of nozzles 706 may be utilized depending upon the pollen spraying and distribution characteristics and the desired pollen coverage and pollen concentration exposure. Because different plants have varying pollination characteristics, the variables impacting pollination (e.g. amount, type, and distribution of pollen) utilizing the system 700 may be similarly varied.

The nozzles 706 are in communication with the pollen source 708 via a first conduit 714 for the first emitter 702 and a second conduit 716 for the second emitter 704. Pollen from the pollen source 708 is delivered through the conduits 714, 716 to the emitters 702, 704, respectively, where the pollen exits the emitters 702, 704 through the nozzles 706. The pollen source 708 utilizes compressed air or the like to propel pollen from the pollen source 708 through the conduits 714, 716, emitters 702, 704, and the nozzles 706. The pressure utilized to deliver pollen from the pollen source 708 through the nozzles 706 is between about 1 psi and about 100 psi, between about 10 psi and about 90 psi, between about 20 psi, and about 80 psi, between about 30 psi and about 70 psi, for example, between about 40 psi and about 60 psi. As a result of the pressurized pollen distribution from the pollen source 708 through the nozzles 706, the plants 328 in the grow tower 150 are exposed to pollen and pollination of the plants 328 is facilitated.

In one embodiment, the emitters 702, 704 are stationary. In this embodiment, the grow towers 150 traverse the grow line 102 and pass by the emitters 702, 704 at which point the pollination process is performed. In an alternative embodiment, the emitters 702, 704 are moved relative to the grow towers 150. In this embodiment, motors 712 are coupled to the rails 710 to facilitate translation of the emitters 702, 704 along the rails 710. In embodiments where the emitters 702, 704 are moveable along the rails 710, the conduits 714, 716 are flexible and extendable to accommodate the movement of the emitters 702, 704. For example, the conduits 714, 716 are coiled flexible tubing or the like.

Figure 8:
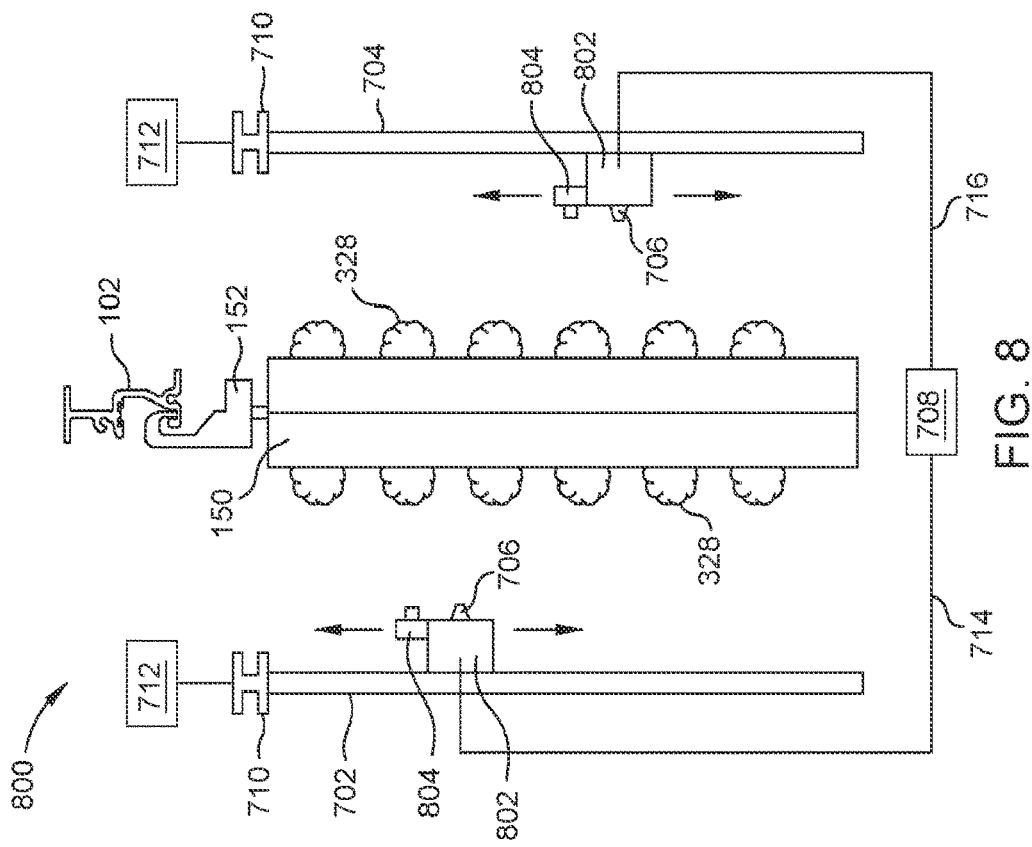
FIG. 8 illustrates an end view of a pollination system according to an embodiment of the disclosure.

FIG. 8 illustrates an end view of a pollination system 800 according to an embodiment of the disclosure. In the illustrated embodiment, the emitters 702, 704 are structural members to which a distributor 802 and camera 804 are coupled. The distributor 802 includes a motor or other suitable apparatus to enable vertical movement along the emitters 702, 704. The nozzle 706 is coupled to the distributor 802 and the nozzle is in fluid communication with the pollen source 708 via the distributor 802 and the conduits 714, 716, respectively. The camera 804 is coupled to the distributor 802 and moves vertically with the distributor 802. The camera 804 is any suitable type of camera or sensor, which is configured to enable visualization or sensing of plant pollination. In one embodiment, the camera 804 enables an operator to selectively pollinate certain plants 328 within the grow tower 150 or every plant within the grow tower 150 with improved accuracy. As a result, pollen conservation is enabled with pollen distribution to the plants 328 in a more precise manner.

The conduits 714, 716 are flexible and extendable to accommodate movement of the distributors 802. In the illustrated embodiment, the conduits 714, 716 are disposed outside of the emitters 702, 704. In another embodiment, the conduits 714, 716 extend from the pollen source 708 through the emitters 702, 704, respectively, where the conduits 714, 716 then couple to the distributors 802. Similar to the system 700, the system 800 includes functionality to move the emitters 702, 704, and thus the distributors 802, cameras 804, and nozzles 706, relative to the grow towers 150 using the motors 712 and rails 710.

Figure 9C:
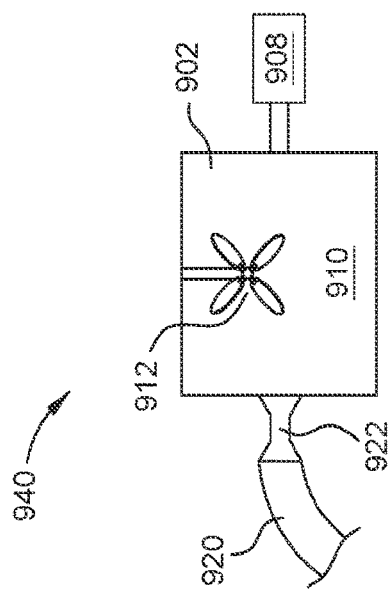
FIG. 9C illustrates a schematic view of a pollen manipulation system according to an embodiment of the disclosure.
Figure 9B:
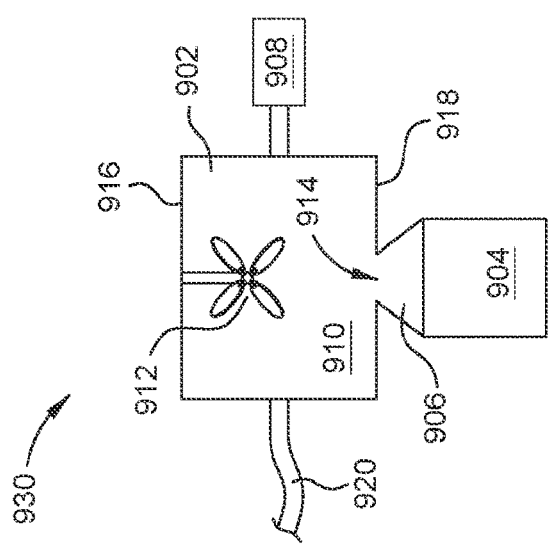
FIG. 9B illustrates a schematic view of a pollen manipulation system according to an embodiment of the disclosure.
Figure 9A:
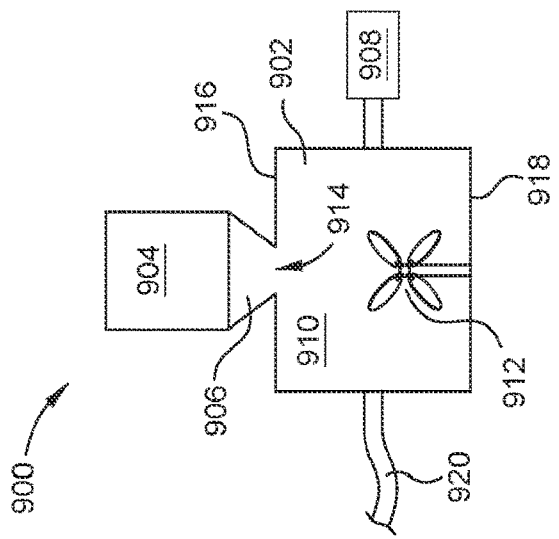
FIG. 9A illustrates a schematic view of a pollen manipulation system according to an embodiment of the disclosure.

FIG. 9A illustrates a schematic view of a pollen manipulation system 900 according to an embodiment of the disclosure. The system 900 is configured to mix and/or deliver pollen to one or more of the systems described herein, for example, the systems, 700, 800, 1100 and is contemplated for utilization as one of the pollen sources 708, 1014, 1114.

The system 900 includes a mixing chamber 902 having a top 916 and a bottom 918 and defining a volume 910 therein. A pollen hopper 904 is coupled to the chamber 902 by a collar 906 and the pollen hopper 904 is in communication with the volume 910 via an opening 914 in the top 916 of the chamber 902. An agitator 912 is disposed within the chamber 902 in the volume 910. A compressor 908, such as an air compressor or the like, is in fluid communication with the volume 910 and a conduit 920 is coupled to the chamber 902 and in fluid communication with the volume 910.

In operation, the system 900 is configured to mix and deliver a pressurized flow of pollen to a pollination system, such as the systems described herein. The system 900, which is a gravity-fed system, stores pollen in the pollen hopper 904 and the pollen is fed into the volume 910 through the collar 906, which is disposed between the pollen hopper 904 and the opening 914 of the chamber 902. As pollen enters the volume 910, the pollen is mixed with pressurized air from the compressor 908. The agitator 912 further agitates and mixes the pollen within the volume 910. In one embodiment, the agitator 912 is an impeller, which further increases a pressure within the chamber 902. The pressurized air and pollen mixture exits the volume 910 via the conduit 920 and the conduit 920 delivers the air and pollen mixture to a pollination system.

FIG. 9B illustrates a schematic view of a pollen manipulation system 930 according to an embodiment of the disclosure. The system 930 is configured to mix and/or deliver pollen to one or more of the systems described herein, for example, the systems, 700, 800, 1100 and is contemplated for utilization as one of the pollen sources 708, 1014, 1114.

The system 930 includes the mixing chamber 902 having the top 916 and the bottom 918 and defining the volume 910 therein. The pollen hopper 904 is coupled to the chamber 902 by the collar 906 and the pollen hopper 904 is in communication with the volume 910 via the opening 914 in the bottom 918 of the chamber 902. The agitator 912 is disposed within the chamber 902 in the volume 910. The compressor 908 is in fluid communication with the volume 910 and the conduit 920 is coupled to the chamber 902 and in fluid communication with the volume 910.

In operation, the system 930 is configured to mix and deliver a pressurized flow of pollen to a pollination system, such as the systems described herein. The system 930, which is a siphon-fed system, stores pollen in the pollen hopper 904 and the pollen is fed into the volume 910 through the collar 906, which is disposed between the pollen hopper 904 and the opening 914 of the chamber 902. Due to the pressure difference in the volume 910 as compared to the pollen hopper 904 and the flow of fluid through the volume 910, pollen from the hopper is pulled up through the collar 906 into the volume. As pollen enters the volume 910, the pollen is mixed with pressurized air from the compressor 908. The agitator 912 further agitates and mixes the pollen within the volume 910. In one embodiment, the agitator 912 is an impeller, which further facilitates transfer of the pollen from the hopper 904 into the volume 910. The pressurized air and pollen mixture exits the volume 910 via the conduit 920 and the conduit 920 delivers the air and pollen mixture to a pollination system.

FIG. 9C illustrates a schematic view of a pollen manipulation system 940 according to an embodiment of the disclosure. The system 940 is configured to mix and/or deliver pollen to one or more of the systems described herein, for example, the systems, 700, 800, 1100 and is contemplated for utilization as one of the pollen sources 708, 1014, 1114.

The system 940 includes the mixing chamber 902, the compressor 908 in fluid communication with the volume 910 of the chamber 902, the agitator disposed within the chamber 902, and the conduit 920 which extends from and is in fluid communication with the volume 910 of the chamber 902. A flow regulator is also disposed between the conduit 920 and the chamber. In this embodiment, the chamber 902 functions as both the pollen hopper and the mixing environment. As such, pressurized air is delivered to the chamber from the compressor 908 where the air is mixed with the pollen in the chamber. The agitator 912 is utilized to further mix the pollen and air. In one embodiment, the agitator 912 is an impeller, which increases a pressure within the chamber 902. The flow regulator 922, such as a valve or the like, is operable to control the pressure and volume of the air/pollen mixture exiting the chamber 902. The flow of the air/pollen mixture controlled by the flow regulator 922 then enters the conduit 920 and continues to a pollination system.

For each of the systems 900, 930, 940, it is contemplated that various components or aspects of each system may be advantageously implemented with other systems without further recitation. By generating a pressurized mixture of pollen and air, the mixture may be delivered to a pollination system in an efficient manner. In one embodiment, the systems 900, 930, 940 are located remotely from the pollination system. In this embodiment, a centralized pollen mixture and pressurization system enables distributed pollination systems within a greater system, such as the system 100, with improved efficiency and conservation of space in a grow system.

Figure 10:
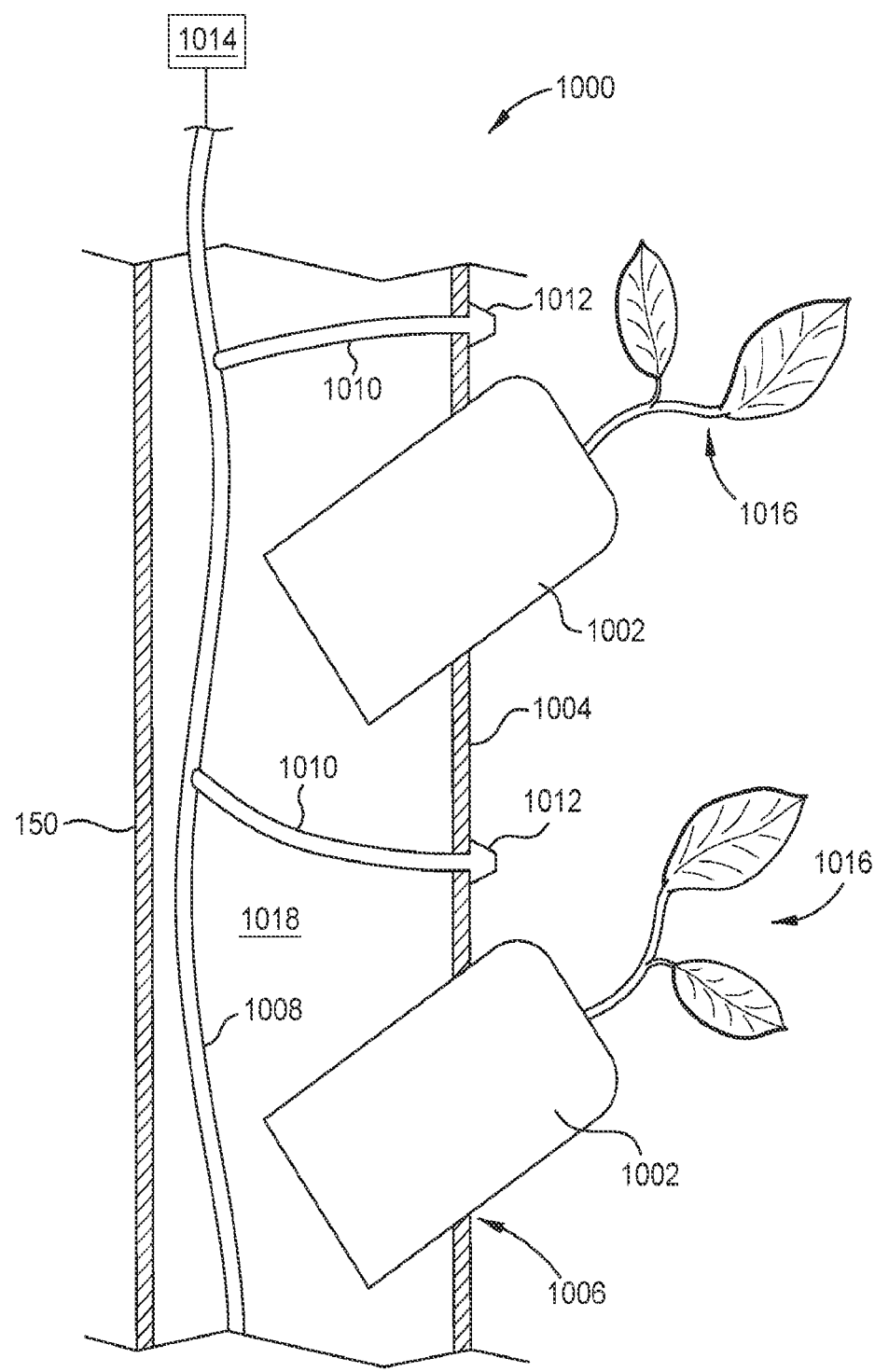
FIG. 10 illustrates a schematic cross-sectional view of a grow tower with an integral pollination system according to an embodiment of the disclosure.

FIG. 10 illustrates a schematic cross-sectional view of a grow tower 150 with an integral pollination system 1000 according to an embodiment of the disclosure. The grow tower 150 is substantially hollow and has a face 1004 within which plug holders 1002 are disposed. The plug holders 1002 are configured to hold a plant 1016 and extend both into the grow tower 150 from the face 1004 and outward from the face 1004 of the grow tower 150. A pollen source 1014, such as one of the systems 900, 930, 940 or the like is in fluid communication with first conduit 1008.

The first conduit 1008 extends from the pollen source 1014 into an interior volume 1018 of the grow tower 150. The first conduit 1008 extends along a length of the grow tower 150 and second conduits 1010 branch from the first conduit 1008. In one embodiment, a second conduit 1010 branches from the first conduit 1008 for each plug holder 1002 disposed in the face 1004. For example, if a grow tower 150 includes 30 plug holders 1002, then 30 second conduits 1010 branch off from the first conduit 1008. A nozzle 1012 is coupled to and in fluid communication with each second conduit 1010. The nozzle is coupled to the face 1004 of the grow tower 150 on an exterior of the grow tower 150. As such, an opening is formed in the face 1004 of the grow tower 150 for each nozzle 1012 and second conduit 1010.

The nozzle 1012 is positioned and aimed at the plant 1016 growing out of the plug holder 1002. A pressurized mixture of air and pollen is delivered from the pollen source 1014 through the first conduit 1008, the second conduit 1010, and the nozzle 1012 to the plant 1016. The routing of the conduits 1008, 1010 within the grow tower 150 reduces or eliminates the utilization of pollination apparatus external to the grow tower 150 which saves space in a grow system. Moreover, the internal pollen delivery architecture reduces the distance between the nozzle 1012 and the plant 1016, which improved pollination accuracy and reduces the amount of pollen utilized to pollinate the plants 1016.

Figure 11:
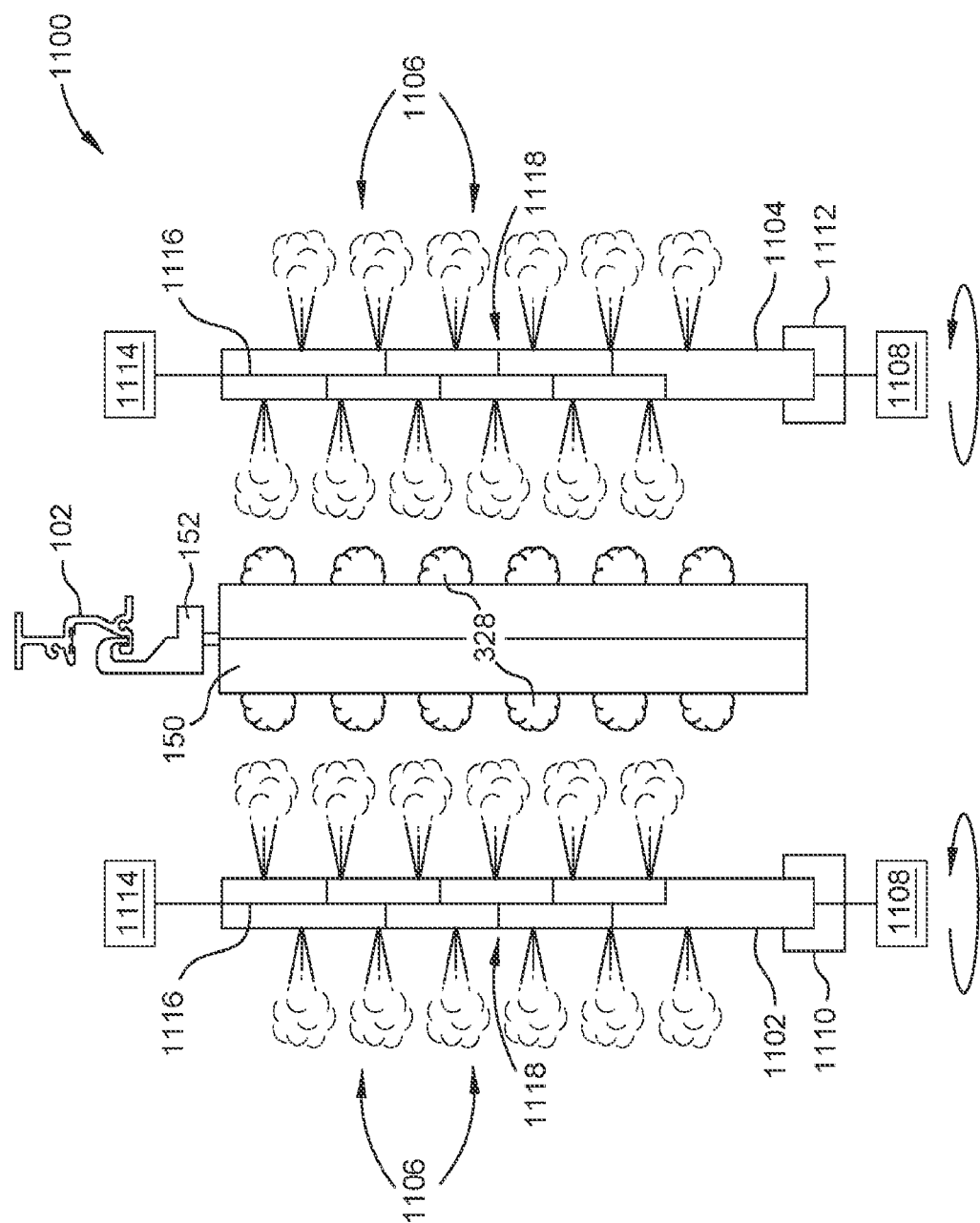
FIG. 11 illustrates an end view of a pollination system according to an embodiment of the disclosure.

FIG. 11 illustrates an end view of a pollination system 1100 according to an embodiment of the disclosure. The system 1100 includes a plurality of columns 1102, 1104 disposed on opposite sides of the grow tower 150. A plurality of brushes 1106 are coupled to and extend from the columns 1102, 1104. The columns 1102, 1104 are coupled to respective supports 1110, 1112, such as a track, rail, base, or other apparatus suitable for supporting the columns 1102, 1104. In the illustrated embodiment, the columns 1102, 1104 are bottom supported by the supports 1110, 1112. Alternatively, a top of the columns 1102, 1104 may be supported by the supports 1110, 1112. The supports 1110, 1112 are coupled to a motor 1108 which is configured to rotate the columns 1102, 1104.

In operation, the motor 1108 rotates the columns 1102, 1104 about an axis which causes the brushes 1106 coupled to the columns 1102, 1104 to rotate and brush against the plants 328 disposed in the grow tower 150. In one embodiment, the columns 1102, 1104 rotate at a rate of between about 1 revolution per minute and about 100 revolutions per minute, between about 5 revolutions per minute and about 50 revolutions per minute, between about 10 revolutions per minute and about 40 revolutions per minute, between about 15 revolutions per minute and about 30 revolutions per minute, such as between about 20 revolutions per minute and about 25 revolutions per minute.

In one embodiment, the brushes 1106 dislodge pollen from the plants 328, which enables the pollen to circulate or fall down onto other plants and facilitate pollination. In another embodiment, the brushes 1106 include bristles with fine fibrous, hair-like, or Velcro-like extensions that, when contacting the plants 328, pull the pollen off the plant 328. When the brushes 1106 rotate and pollen attached the bristles contact another plant 328, the pollen may become dislodged from the bristles and another plant is pollinated.

In another embodiment, pollen is delivered through the columns 1102, 1104 to further facilitate pollination of the plants 328. In this embodiment, conduits 1116 extend from the pollen source 1114 and through an interior of the columns 1102, 1104 to outlets 1118 formed in the columns 1102, 1104 between where the brushes 1106 are coupled the columns 1102, 1104. In operation, a pressurized mixture of air and pollen is delivered from the pollen source 1114 through the conduits 1116 and through the outlets 1118. When the columns 1102, 1104 are rotating, the pollen delivered through the outlets 1118 is flowed onto the plants 328, deposited on the brushes 1106 for contact-pollination when the brushes 1106 contact the plants 328, or otherwise directed toward the plants 328 to facilitate pollination.

In certain embodiments, the columns 1102, 1104 and supports 1110, 1112 remain stationary (although rotating about an axis) while the grow tower 150 traverses along the travel path 312 past the rotating brushes 1106 of the columns 1102, 1104. In another embodiment, the motor 1108 moves the columns 1102, 1104 along supports 1110, 1112 in a direction parallel with the travel path 312. In this embodiment, the grow tower 150 is stationary. Alternatively, the grow tower 150 may be in motion while the columns 1102, 1104 are moving.

Exemplary implementations of the disclosure are described herein and may be combined with one another without further recitation.

In one implementation, a pollination system includes a grow line having a plurality of grow towers disposed thereon, a pollination chamber defining a volume, the pollination chamber coupled to the grow line and operable to isolate one or more grow towers within the volume from a surrounding environment, a pollen source in fluid communication with the volume, and a blower in fluid communication with the volume, the blower adapted to circulate pollen within the volume.

The system according to any one of the previous implementations wherein the pollination chamber comprises a plurality of walls, wherein at least two walls of the plurality of walls comprise openings to enable passage of the grow towers therethrough.

The system according to any one of the previous implementations and further comprising a screen disposed between the blower and the volume, an opening formed in the screen, and a conduit extending from the opening formed in the screen to the pollen source.

The system according to any one of the previous implementations wherein the blower is in fluid communication with the volume via a fluid inlet and a fluid outlet.

The system according to any one of the previous implementations wherein the fluid inlet and the fluid outlet are formed in a base of the pollination chamber.

The system according to any one of the previous implementations and further comprising a screen disposed between the base of the pollination chamber and the volume.

The system according to any one of the previous implementations and further comprising a plurality of walls and a screen extending between the plurality of walls and defining a lower bound of the volume.

The system according to any one of the previous implementations wherein the screen has a mesh size selected to prevent the passage of pollen therethrough.

The system according to any one of the previous implementations wherein a major axis of the volume is oriented vertically.

In one implementation, a pollination apparatus includes a plurality of walls at least partially defining a volume therein, a ceiling coupled to the plurality of walls, a base coupled to the plurality of walls opposite the ceiling, a screen coupled to each wall of the plurality of walls and extending across the volume, a blower in fluid communication with the volume via an outlet formed in the base, and a pollen source in fluid communication with the volume.

The apparatus according to any one of the previous implementations wherein the blower is in fluid communication with the volume via an inlet formed in the base.

The apparatus according to any one of the previous implementations wherein a conduit extends between the pollen source and the volume.

The apparatus according to any one of the previous implementations wherein the conduit extends from an opening formed in the screen to the pollen source.

The apparatus according to any one of the previous implementations wherein at least one wall of the plurality of walls is configured to enable passage of a grow tower therethrough.

The apparatus according to any one of the previous implementations wherein a first wall of the plurality of walls comprises a first opening and a second wall of the plurality of walls comprises a second opening, and wherein the first opening and the second opening are opposite one another.

The apparatus according to any one of the previous implementations and further comprising a first door coupled to the first wall, the first door operable to move relative to the first opening, and a second door coupled to the second wall, the second door operable to move relative to the second opening.

In one implementation, a pollination system includes a grow line having a plurality of grow towers disposed thereon, a gutter disposed opposite the grow line, the gutter comprising a channel sized to accommodate a width of the grow towers, and one or more vibration generators coupled to the gutter or the grow line.

The system according to any one of the previous implementations wherein the one or more vibration generators are an acoustic vibration generator, a mechanical vibration generator, a magnetic vibration generator, a pneumatic vibration generator, an electric vibration generator, electro-mechanical vibration generator, piezoelectric vibration generator, or an ultrasonic vibration generator.

The system according to any one of the previous implementations wherein the gutter comprises a damper formed therein and further defining the channel.

The system according to any one of the previous implementations wherein the damper is formed from a polymeric or rubber containing material.

The system according to any one of the previous implementations wherein a first vibration generator is coupled to the gutter and a second vibration generator is coupled to the grow line.

The system according to any one of the previous implementations wherein the second vibration generator comprises a plurality of vibration generators coupled to the grow line.

The system according to any one of the previous implementations wherein the grow line comprises a plurality of isolators formed in the grow line.

The system according to any one of the previous implementations wherein each second vibration generator coupled to the grow line is separated from adjacent second vibration generators by at least two isolators.

The system according to any one of the previous implementations and further comprising a first stand disposed adjacent to a first side of the grow towers, and one or more third vibration generators coupled to the first stand.

The system according to any one of the previous implementations and further comprising a second stand disposed adjacent to a second side of the grow towers, and one or more fourth vibration generators coupled to the second stand.

The system according to any one of the previous implementations wherein the first side and the second side are opposite sides of the grow towers.

The system according to any one of the previous implementations wherein the one or more third vibration generators are acoustic vibration generators.

The system according to any one of the previous implementations wherein the acoustic vibration generators are subwoofers.

The system according to any one of the previous implementations wherein the one or more fourth vibration generators are acoustic vibration generators.

The system according to any one of the previous implementations wherein the acoustic vibration generators are subwoofers.

In one implementation, a pollination system includes a grow line, a grow tower coupled to the grow line by a hook at a first end of the grow tower, the hook comprising a spring, a peg coupled to and extending from a second end of the grow tower opposite the first end, and a wedge disposed adjacent to the second end of the grow tower.

The system according to any one of the previous implementations wherein the hook further comprises, a first portion, a second portion, the spring coupled between the first portion and the second portion, and a flange extending from the second portion opposite the spring.

The system according to any one of the previous implementations wherein the flange is configured to couple to the grow tower.

The system according to any one of the previous implementations wherein the spring comprises a coil spring.

The system according to any one of the previous implementations wherein the spring comprises a cord, rope, or tube fabricated from an elastomeric material.

The system according to any one of the previous implementations wherein the wedge has a surface angled with respect to a horizontal datum plane.

The system according to any one of the previous implementations wherein the surface is disposed at a first elevation at an upstream position along a travel path of the grow tower and a second elevation lower than the first elevation at a downstream positon along the travel path of the grow tower.

The system according to any one of the previous implementations wherein the peg is configured to contact the surface of the wedge.

In one implementation, a pollination method includes moving a grow tower comprising a peg, coupled to a grow line by a hook comprising a spring, along a travel path, engaging the peg with a surface of a wedge, continuing to move the grow tower along the travel path and causing the spring to elongate, and continuing to move the grow tower along the travel path so that the peg disengages from the surface of the wedge.

The method according to any one of the previous implementations wherein the spring is substantially in an equilibrium position prior to the peg engaging the surface of the wedge.

The method according to any one of the previous implementations wherein the spring is in an extended state during engagement of the peg with the surface of the wedge.

The method according to any one of the previous implementations wherein the spring is in a compressed state after the peg disengages from the surface of the wedge.

In one implementation, a pollination system includes a grow line having one or more grow towers disposed thereon, a first emitter disposed adjacent to a first side of the grow towers, a second emitter disposed adjacent to a second side of the grow towers opposite the first side, a plurality of nozzles coupled to each of the first and second emitters, and a pollen source in fluid communication with the nozzles via the first and second emitters.

The system according to any one of the previous implementations wherein the plurality of nozzles are distributed along a length of each of the first and second emitters.

The system according to any one of the previous implementations and further comprising a first conduit in fluid communication between the first emitter and the pollen source, and a second conduit in fluid communication between the second emitter and the pollen source.

The system according to any one of the previous implementations wherein each of the first and second conduits comprise flexible coiled tubing.

The system according to any one of the previous implementations and further comprising one or more rails, wherein the first and second emitters are coupled to the rails on opposite sides of the grow towers, and a motor operable to move the first and second emitters along the rails.

The system according to any one of the previous implementations wherein the rails support the first and second emitter from a top end of the emitters and suspend the emitters.

In one implementation, a pollination system includes a grow line having one or more grow towers disposed thereon, a first emitter disposed adjacent to a first side of the grow towers, a second emitter disposed adjacent to a second side of the grow towers opposite the first side, distributors comprising one or more nozzles coupled to each of the first and second emitters, and a camera coupled to each of the distributors.

The system according to any one of the previous implementations and further comprising a first conduit in fluid communication between the distributor coupled to the first emitter and a pollen source, and a second conduit in fluid communication between the distributor coupled to the second emitter and the pollen source.

The system according to any one of the previous implementations wherein each of the first and second conduits comprise flexible coiled tubing.

The system according to any one of the previous implementations wherein the first conduit is disposed within the first emitter and the second conduit is disposed within the second emitter.

The system according to any one of the previous implementations and further comprising one or more rails, wherein the first and second emitters are coupled to the rails on opposite sides of the grow towers, and a motor operable to move the first and second emitters along the rails.

The system according to any one of the previous implementations wherein the rails support the first and second emitter from a top end of the emitters and suspend the emitters.

In one implementation, a pollination method includes identifying, via visualization by a camera, a plant disposed in a grow tower to be pollinated, moving a pollen distributor comprising a nozzle in a vertical plane to a position adjacent to the plant to be pollinated, and delivering pollen to the plant via the nozzle and the distributor.

The method according to any one of the previous implementations wherein the grow tower is stationary during the pollen delivery.

The method according to any one of the previous implementations wherein the grow tower is in motion during the pollen delivery.

The method according to any one of the previous implementations wherein the distributor and nozzle are in motion during the pollen delivery.

The method according to any one of the previous implementations wherein the distributor and nozzle are in motion during the pollen delivery.

In one implementation, a pollination apparatus includes a grow tower having a face with a plurality of plug holders disposed therein, a first conduit extending through an internal volume of the grow tower, a plurality of second conduits extending from the first conduit to the face adjacent to each of the plurality of plug holders, and a nozzle coupled to each of the plurality of second conduits, the nozzles disposed on the face of the grow tower.

The apparatus according to any one of the previous implementations and further comprising a pollen source in fluid communication with the first conduit.

The apparatus according to any one of the previous implementations wherein the each nozzle is directed toward a plant disposed in each plug holder.

In one implementation, a pollination system includes a grow line having one or more grow towers disposed thereon, a first column disposed adjacent to a first side of the grow towers, a second column disposed adjacent to a second side of the grow towers opposite the first side, and a plurality of brushes coupled to and extending from each of the first and second columns.

The system according to any one of the previous implementations and further comprising a first support coupled to the first column, a second support coupled to the second column, and motors coupled to the first and second supports, the motors operable to rotate the first and second columns about an axis.

The system according to any one of the previous implementations and further comprising a conduit extending through each of the first and second columns to a plurality of outlets formed in the columns, and a pollen source in fluid communication with the outlets via the conduit.

The system according to any one of the previous implementations wherein the brushes comprise fibers or hair-like extensions.

The system according to any one of the previous implementations wherein the motors are operable to move the columns along the supports in a direction substantially parallel to a travel path of the grow towers.

The system according to any one of the previous implementations wherein the first and second supports are coupled to a bottom of the first and second columns, respectively.

The system according to any one of the previous implementations wherein the first and second supports are coupled to a top of the first and second columns, respectively.

In one implementation, a pollination method includes moving a grow tower into a pollination chamber, isolating a volume of the pollination chamber from a surrounding environment, delivering pollen to the pollination chamber, and pollinating plants disposed in the grow tower.

In one implementation, a pollination method includes moving a grow tower through a gutter, contacting the grow tower with the gutter, and vibrating the gutter to induce vibration of the grow tower.

In one implementation, a pollination method includes moving a grow tower to a position located adjacent to one or more acoustic vibration generators, and actuating the acoustic vibrations generators to vibrate the grow tower.

In one implementation, a pollination method includes moving a grow tower adjacent to one or more columns comprising one or more brushes, and moving the brushes into contact with plants disposed in the grow tower to promote pollination.

In one implementation, a plant pollination apparatus includes chamber for pollinating plants, a pollen source in communication with the chamber, and a blower coupled to the chamber to circulate pollen within the chamber.

Embodiments described herein enable pollination of plants disposed in a vertical agriculture system without the utilization of conventional pollination vectors, such as been or the other insects. The apparatus and methods described herein provide for mechanized pollination suitable for unique vertical growing architectures in controlled indoor agricultural environments.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:

a grow line having a plurality of grow towers disposed thereon;

a chamber defining a volume, the chamber coupled to the grow line and operable to isolate one or more grow towers within the volume, the volume at least partially defined by:

a plurality of walls;

a ceiling coupled to the plurality of walls;

a base coupled to the plurality of walls opposite the ceiling;

a screen coupled to each wall of the plurality of walls, extending across the volume, and in contact with the base, the screen having a mesh size of substantially 1 μm to substantially 100 μm;

a blower in fluid communication with the volume via an outlet formed in the base, wherein the screen separates the blower from the volume; and a pollen source in fluid communication with the volume via a conduit extending through the base with an opening formed in the screen, wherein the screen separates the pollen source from the volume.

2. The system of claim 1, wherein the blower is in fluid communication with the volume via an inlet formed in the base.

3. The system of claim 1, further comprising a plenum defined between the screen and the base, wherein the screen separates the volume from the plenum.

4. The system of claim 1, wherein at least one wall of the plurality of walls is configured to enable passage of a grow tower therethrough.

5. The system of claim 4, wherein a first wall of the plurality of walls comprises a first opening and a second wall of the plurality of walls comprises a second opening, and wherein the first opening and the second opening are opposite one another.

6. The system of claim 5, further comprising:

a first door coupled to the first wall, the first door operable to move relative to the first opening; and a second door coupled to the second wall, the second door operable to move relative to the second opening.

* * * * *